United States Patent
Watanabe et al.

(10) Patent No.: US 10,834,307 B2
(45) Date of Patent: Nov. 10, 2020

(54) IMAGE PICKUP APPARATUS

(71) Applicant: CANON KABUSHIKI KAISHA, Tokyo (JP)

(72) Inventors: Naoki Watanabe, Atsugi (JP); Hideaki Yamamoto, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 143 days.

(21) Appl. No.: 15/984,148

(22) Filed: May 18, 2018

(65) Prior Publication Data

US 2018/0343380 A1    Nov. 29, 2018

(30) Foreign Application Priority Data

May 24, 2017  (JP) ................................. 2017-102856
Apr. 20, 2018  (JP) ................................. 2018-081156

(51) Int. Cl.
*H04N 5/232* (2006.01)
*H04N 5/225* (2006.01)

(52) U.S. Cl.
CPC ....... *H04N 5/23212* (2013.01); *H04N 5/2254* (2013.01); *H04N 5/2257* (2013.01); *H04N 5/23293* (2013.01); *H04N 5/232133* (2018.08); *H04N 5/232933* (2018.08); *H04N 5/232941* (2018.08); *H04N 5/232945* (2018.08); *H04N 5/23209* (2013.01)

(58) Field of Classification Search
CPC ......... H04N 5/23212; H04N 5/232945; H04N 5/232933; H04N 5/232941; H04N 5/232133; H04N 5/2254; H04N 5/2257; H04N 5/23293; H04N 5/23209
See application file for complete search history.

(56) References Cited

U.S. PATENT DOCUMENTS

2017/0347019 A1* 11/2017 Ito .............................. G02B 7/28

FOREIGN PATENT DOCUMENTS

| JP | 4972202 B2 | 7/2012 |
| JP | 5734044 B2 | 6/2015 |
| JP | 6198437 B2 | 9/2017 |

* cited by examiner

*Primary Examiner* — Twyler L Haskins
*Assistant Examiner* — Fayez Bhuiyan
(74) *Attorney, Agent, or Firm* — Canon U.S.A., Inc. IP Division

(57) ABSTRACT

An image pickup apparatus to which a lens unit is attachable includes at least one processor and a memory holding a program which makes the processor function as: an acquisition unit configured to acquire information about the attached lens unit; a setting unit capable of setting an adjustment value for setting, from a plurality of values, an adjustment amount for adjusting a focal point shift amount of the lens unit; and a control unit configured to acquire the adjustment amount based on the adjustment value set by the setting unit and information about the lens unit acquired by the acquisition unit, and adjust the focal point shift amount of the lens unit by using the adjustment amount. The setting unit changes a first range according to the information about the lens unit acquired by the acquisition unit, the first range being a range of settable adjustment values.

19 Claims, 12 Drawing Sheets

FIG. 4
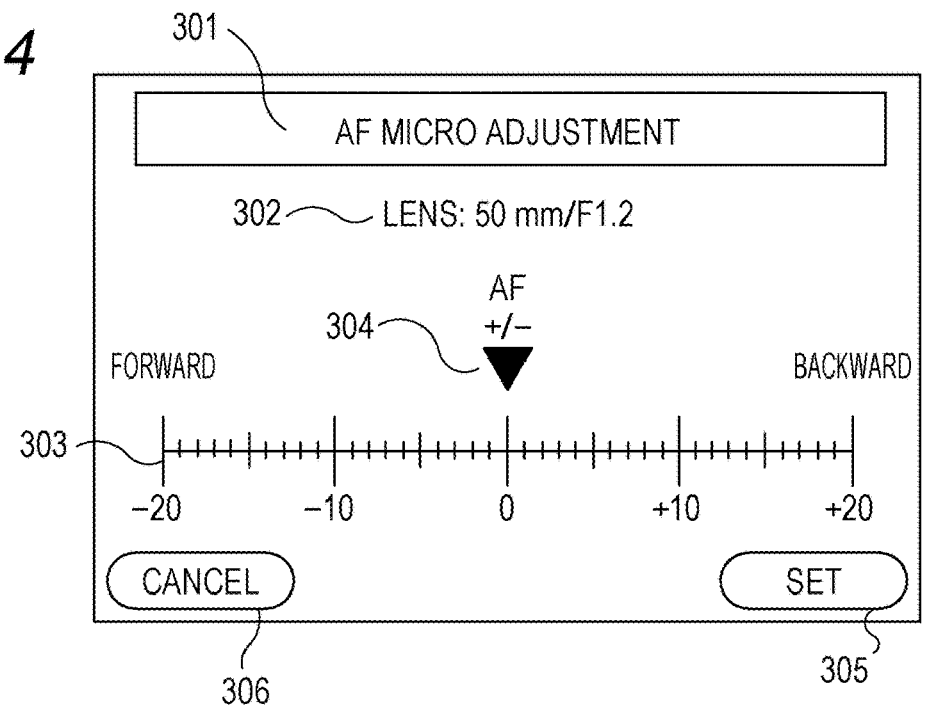
FIG. 5
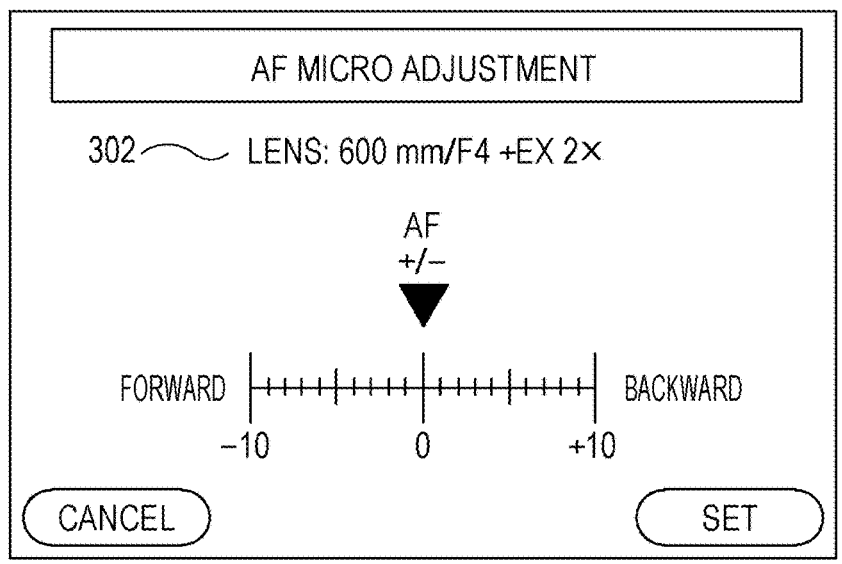
FIG. 6
| F-NUMBER | SETTABLE SCALE |
|---|---|
| EQUAL TO OR LESS THAN F2.8 | ±20 |
| EQUAL TO OR LESS THAN F5.6 | ±15 |
| MORE THAN F5.6 | ±10 |

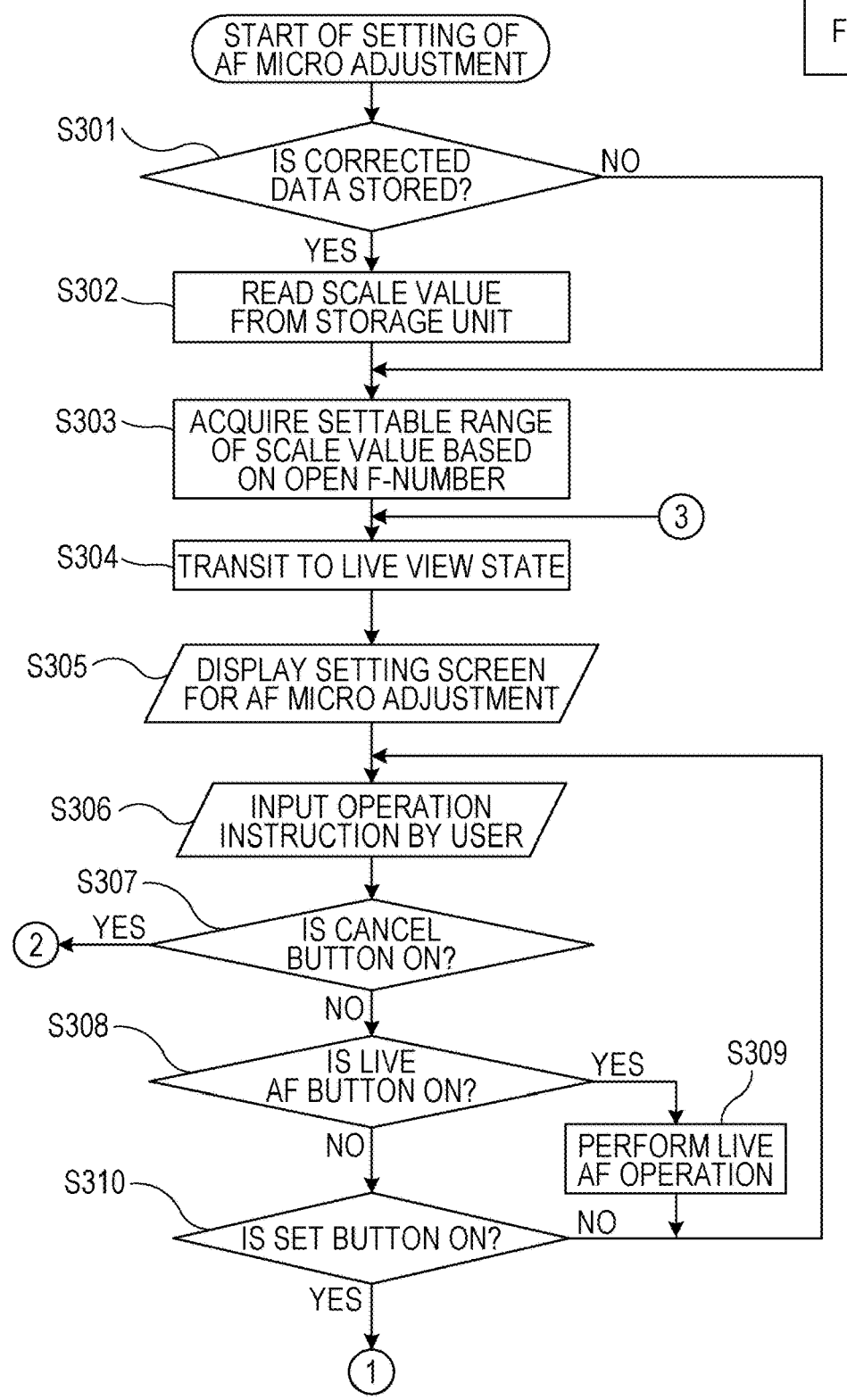

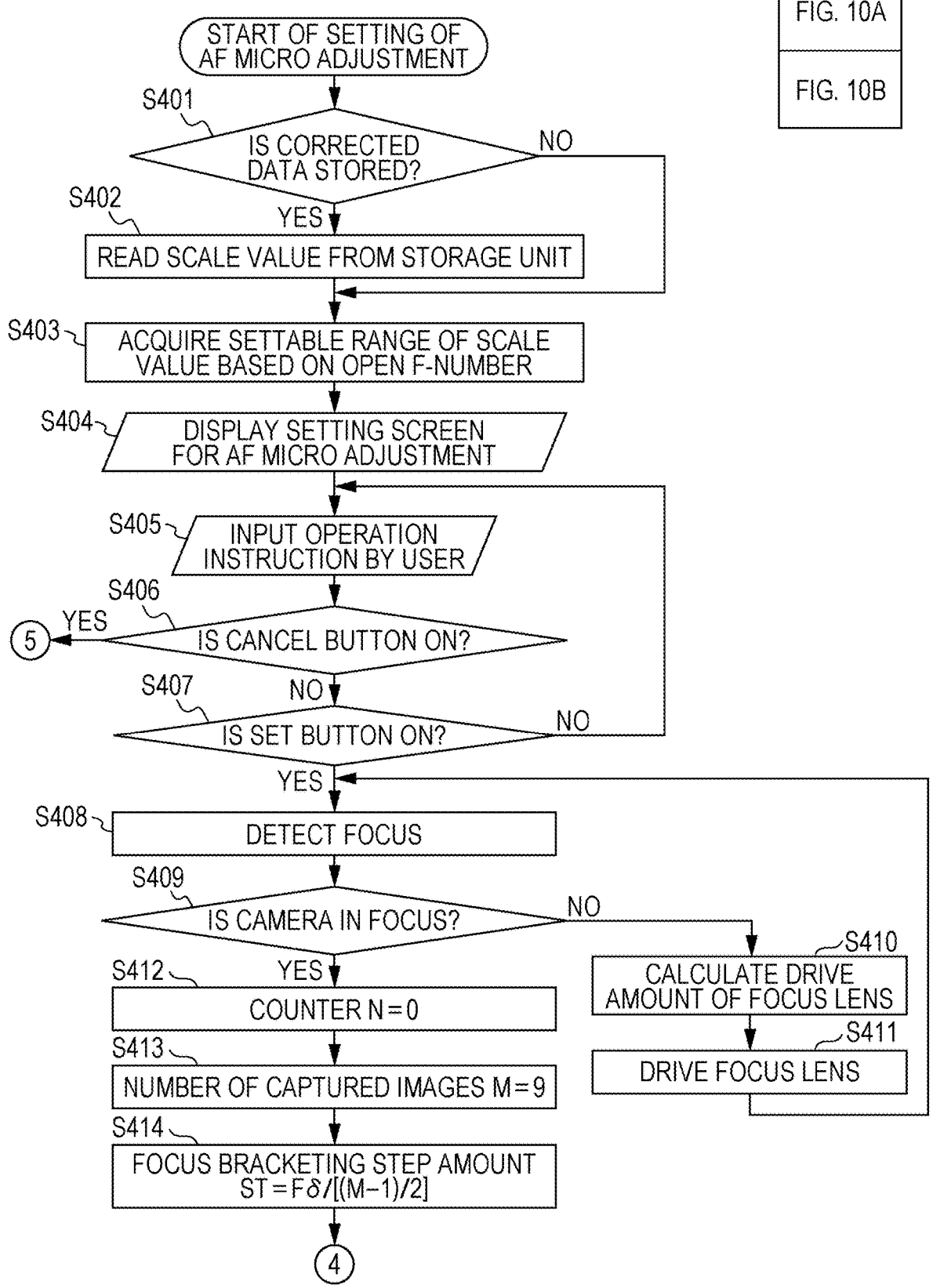

IMAGE PICKUP APPARATUS

BACKGROUND

Field of the Disclosure

The present disclosure relates to a lens-interchangeable image pickup apparatus, and more particularly, to an image pickup apparatus having a function for correcting an in-focus position detected by focus detection.

Description of the Related Art

Cameras capable of interchanging imaging lenses may be required to perform a fine adjustment of an in-focus position depending on a combination of an imaging lens to be used and a camera body. In particular, in a single-lens reflex camera or the like including a secondary image-forming phase-difference auto focus (AF) using a dedicated optical system, a difference is generated between the in-focus position of the phase difference AF and the in-focus position of an image pickup element, so that the problem with the adjustment of the in-focus position may become evident.

To solve such a problem, a technique for adjusting an in-focus position of a phase difference AF depending on a lens is known. Japanese Patent No. 5734044 discusses a technique in which an adjustment amount of the in-focus position of the phase difference AF is set depending on the type of the imaging lens and a fine adjustment of the in-focus position is performed using the adjustment amount. The adjustment amount is set based on a value (e.g., +2) set by a user.

Japanese Patent No. 04972202 discusses a technique in which the interval of an adjustment amount corresponding to a settable value (scale value) is changed according to an open F-number, and a focal depth is prevented from greatly deviating due to a shift of the adjustment amount by the same value as that when the focal depth is large even in a case where the open F-number is small and the focal depth is small. A determination as to whether a camera is in focus is generally made based on the focal depth. The focal depth is represented by the product of the open F-number and the permissible confusion circle diameter of the imaging lens. Accordingly, in the technique discussed in Japanese Patent No. 04972202, a blurring variation per scale is made constant regardless of the open F-number by setting a constant multiple of the product of the open F-number and the permissible confusion circle diameter as the interval of the scale value used for setting the adjustment amount. On the other hand, Japanese Patent No. 06198437 discusses an image pickup apparatus capable of automatically setting an adjustment amount of a phase difference AF by using a contrast AF.

SUMMARY

The present disclosure is directed to providing an image pickup apparatus capable of setting an AF adjustment amount, in which it is possible to prevent incorrect setting.

According to an aspect of the present disclosure, an image pickup apparatus to which a lens unit is attachable includes at least one processor and a memory holding a program which makes the processor function as: an acquisition unit configured to acquire information about the attached lens unit; a setting unit capable of setting an adjustment value for setting, from a plurality of values, an adjustment amount for adjusting a focal point shift amount of the lens unit; and a control unit configured to acquire the adjustment amount based on the adjustment value set by the setting unit and information about the lens unit acquired by the acquisition unit, and adjust the focal point shift amount of the lens unit by using the adjustment amount. The setting unit changes a first range according to the information about the lens unit acquired by the acquisition unit, the first range being a range of settable adjustment values.

Further features of the present disclosure will become apparent from the following description of exemplary embodiments (with reference to the attached drawings).

BRIEF DESCRIPTION OF THE DRAWINGS

FIG. 4 is a diagram illustrating an example of a screen displayed on a display unit when the scale value is set in the AF micro adjustment according to one or more aspects of the present disclosure.

FIG. 5 is a diagram illustrating another example of a screen displayed on the display unit when the scale value is set in the AF micro adjustment according to one or more aspects of the present disclosure.

FIG. 6 is a table illustrating a relationship between an open F-number and a range of scale values that can be input in the AF micro adjustment according to one or more aspects of the present disclosure.

DESCRIPTION OF THE EMBODIMENTS

Figure 1:
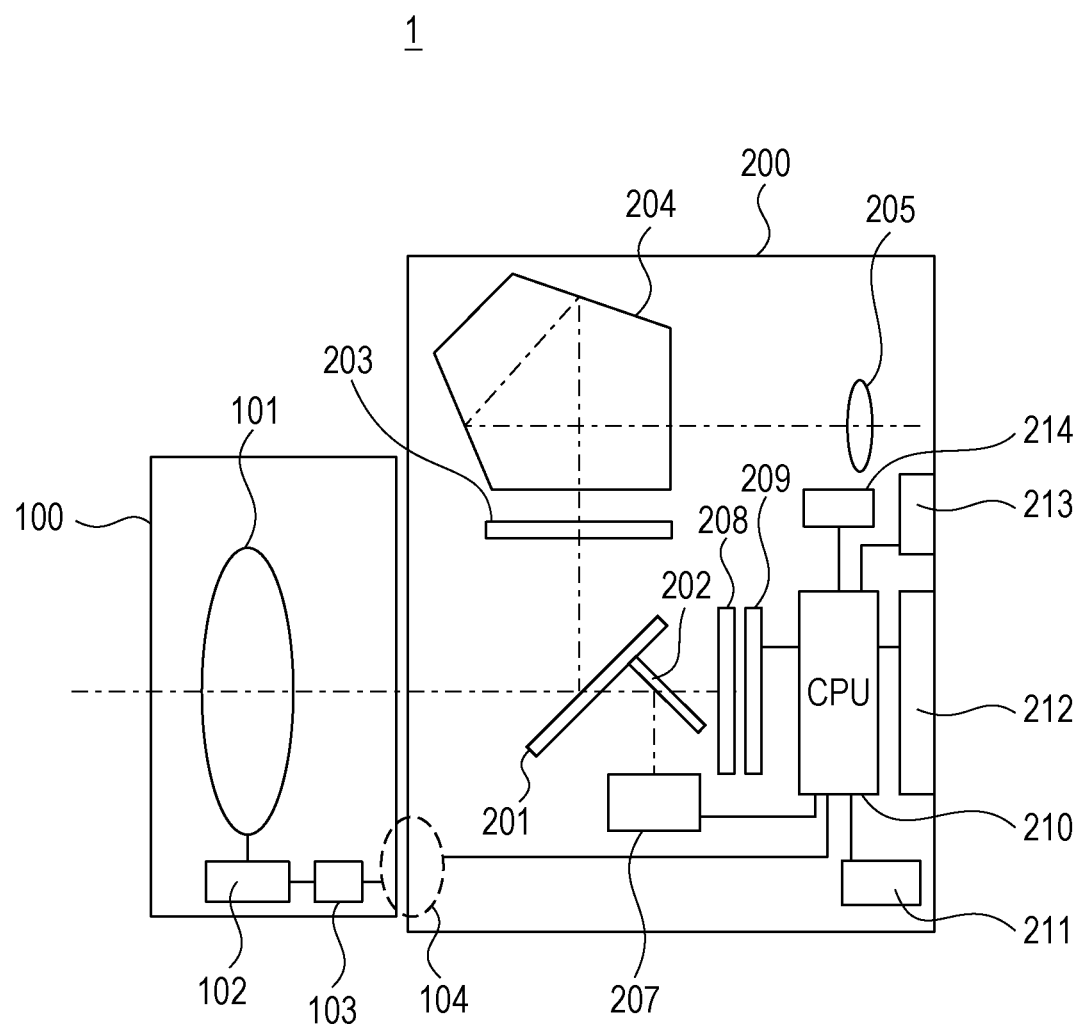
FIG. 1 is a schematic configuration diagram illustrating an image pickup apparatus according to one or more aspects of the present disclosure.

Exemplary embodiments of the present disclosure will be described in detail below with reference to the drawings. In the drawings, the same members are denoted by the same reference numerals and a repeated explanation is omitted.

The inventor of the present disclosure has found a problem that when an imaging lens with a large open F-number is used, the accuracy of auto focus may deteriorate due to setting of an AF adjustment amount by a user.

For example, assume a case where a 2-power conversion lens is attached to an imaging lens having a focal length of 50 mm and an open F-number of 1.2 and a case where a 2-power conversion lens is attached to an imaging lens having a focal length of 600 mm and an open F-number of 4.0 (these cases are hereinafter referred also to as 50/1.2 and 600/4.0×2).

Assuming that a permissible confusion circle diameter is 30 μm, the focal depth of 50/1.2 is 36 μm and the focal depth of 600/4.0×2 is 240 μm. Accordingly, in the two imaging lenses described above, when the same scale value is input with the number of scales by the open F-number, the distance of the in-focus position of 600/4.0×2 to be corrected is about seven times the distance of the in-focus position of 50/1.2 to be corrected. The function for performing a fine adjustment of the AF in-focus position is intended to adjust a deviation in in-focus position of about several tens of μm due to, for example, a combination of the imaging lens and the camera body. It is unusual that such a large correction amount is required. However, in the related art, since a value corresponding to a large adjustment amount can be set depending on the open F-number of the lens unit, there is a possibility that a user may set an incorrect value and incorrect distance measurement or malfunction may be caused against user's intention.

Like in the technique discussed in Japanese Patent No. 06198437, even when the adjustment amount is automatically set, a user may incorrectly set the adjustment amount depending on the conditions for automatic setting instructed by the user.

An image pickup apparatus capable of preventing incorrect setting when an AF adjustment amount is set will be described with reference to the following first to fourth exemplary embodiments.

The image pickup apparatus according to the present exemplary embodiment acquires information about an attached imaging lens unit. A user sets a desired adjustment value from a plurality of adjustment values. The image pickup apparatus acquires an AF adjustment amount corresponding to each adjustment value according to the information about the attached lens unit. The range of setting values that can be set by the user is changed according to the information about the attached lens unit. Accordingly, a large adjustment amount which is not assumed to be generally used can be prevented from being set by the user. In the present exemplary embodiment, a single-lens reflex camera is illustrated as an example of the image pickup apparatus. However, the image pickup apparatus is not limited to a single-lens reflex camera, as long as the image pickup apparatus has an AF function. The present exemplary embodiment illustrates an example in which the open F-number is used as information about the imaging lens unit. The open F-number of the attached imaging lens unit used herein refers to the open F-number of the entire imaging optical system other than the main body of the image pickup apparatus. For example, assume that, when a conversion lens is attached, the open F-number refers to the open F-number of the imaging lens unit including the conversion lens. The function for adjusting the in-focus position of the AF is not only intended to set the in-focus position of the lens unit to be close to an accurate in-focus position, but the function can also be used for the user to intentionally shift the in-focus position from the correct in-focus position. For example, the function for adjusting the in-focus position of the AF can meet the user's needs such as image capturing by keeping the camera in focus at a location closer to the user rather than a correct position. The adjustment amount for shifting the in-focus position from the correct in-focus position is also set as the amount of correction for the user to correct the in-focus position to a desired in-focus position. Accordingly, the AF adjustment amount is herein referred to as an AF correction amount.

FIG. 1 is a schematic configuration diagram illustrating an image pickup system 1 according to the present exemplary embodiment.

As illustrated in FIG. 1, an imaging lens unit 100 is detachably attached to an image pickup apparatus 200 through a lens mounting mechanism of a mount unit which is not illustrated. The mount unit is provided with an electrical contact unit 104. A desired imaging lens unit selected from a plurality of imaging lens units can be attached to the mount unit. The image pickup apparatus 200 communicates with the imaging lens unit 100 through the electrical contact unit 104 and controls a focus lens 101 included in the imaging lens unit 100. FIG. 1 illustrates only the focus lens 101 as an imaging optical system included in the imaging lens unit 100. However, other lenses, such as a magnification lens and a fixed lens, may also be included.

A light beam from a subject is guided to a main mirror 201 in the image pickup apparatus 200 through the imaging optical system of the imaging lens unit 100. The main mirror 201 is disposed obliquely to an optical axis in a photographic optical path and is turnable between a first state (state illustrated in FIG. 1) in which the light beam from the subject is guided to a finder optical system, which is disposed above the main mirror 201, and a second state in which the light beam is retracted to the outside of the photographic optical path.

When the main mirror 201 is in the first state, the main mirror 201 reflects the light beam from the subject and guides the light beam to the finder optical system disposed above the main mirror 201. A central portion of the main mirror 201 is a half mirror. When the main mirror 201 is in the first state, a part of the light beam from the subject passes through the half mirror portion. The light beam which has passed through the half mirror portion is reflected by a sub-mirror 202, which is provided on a back surface of the main mirror 201, and is guided to a focus detection unit 207.

The focus detection unit 207 is a focus detection unit according to the present exemplary embodiment. The focus detection unit 207 is a unit including a dedicated optical system and a photoelectric conversion element. An in-focus position of the imaging optical system included in the lens unit from the formed subject image is detected, and transmits the calculation result to a camera CPU 210 described below.

On the other hand, the light beam reflected by the main mirror 201 is formed on a focusing plate 203 which is disposed at a position that is optically conjugate to an image pickup element 209. The light (subject image) which has been diffused by the focusing plate 203 and passed through the focusing plate 203 is converted into an erected image by a pentaprism 204. The erected image is enlarged by an eye-piece lens 205 and observed by the user.

When the main mirror 201 is in the second state, the sub-mirror 202 is folded with respect to the main mirror 201 and retracted to the outside of the photographic optical path. The light beam from the imaging optical system passes through a focal plane shutter 208, which is a mechanical shutter, and reaches the image pickup element 209. The focal plane shutter 208 limits the amount of light incident on the image pickup element 209.

The image pickup element 209 is an image sensor composed of a photoelectric conversion element, such as a charge-coupled device (CCD) sensor or a complementary metal-oxide semiconductor (CMOS) sensor. The image pickup element 209 photoelectrically converse the subject image formed by the imaging optical system to form an image.

The camera CPU 210 is composed of a microprocessor, and controls the entire image pickup apparatus 200, such as various calculations and various operations performed by the image pickup apparatus 200. Further, the camera CPU 210 communicates with a lens control circuit 103 in the imaging lens unit 100 through the electrical contact unit 104, acquires information about the lens unit, and sends an instruction to the lens unit. The lens control circuit 103 controls a lens driving mechanism 102 by driving the focus lens 101 in an optical axis direction in response to a signal from the camera CPU 210. The focus lens 101 is driven to perform a focus adjustment. The lens driving mechanism 102 includes a motor as a drive source and drives lenses such as the focus lens 101. Different types of motor, such as a stepping motor and an ultrasonic motor, are used depending on the type of the imaging lens unit.

The camera CPU 210 is connected to each of a storage unit 211, a display unit 212, an operation detection unit 213, and a sound production unit 214.

The storage unit 211 is composed of a nonvolatile memory element such as an electrically erasable programmable read-only memory (EEPROM). The storage unit 211 stores parameters necessary for adjustment to control the image pickup apparatus 200, camera identification (ID) information, which is unique information for identifying the image pickup apparatus, adjustment values for parameters associated with image capturing that are adjusted using a reference lens during production, and the like.

The display unit 212 is composed of a liquid crystal display element capable of color display. The display unit 212 is a device that displays the subject image output from the image pickup element 209 and displays items to be set by the user, and functions as a display unit in the image pickup apparatus 200.

The operation detection unit 213 transmits, to the camera CPU 210, the signal based on the user's operation through an operation member (not illustrated). As the operation member, various selection buttons, a dial, a release button configured to sequentially turn on a first switch (SW 1) and a second switch (SW 2) according to the amount of pressing for instructing an image capturing operation, a touch panel that works with the display unit 212, and the like are used.

The sound production unit 214 produces sound according to the instruction from the camera CPU 210.

The lens control circuit 103 of the imaging lens unit 100 is provided with a memory (not illustrated) that stores various information. The memory stores performance information such as the focal length and maximum aperture value of the imaging lens unit 100, lens identification (ID) information, which is unique information for identifying the imaging lens unit 100, information received from the camera CPU 210, and the like. The performance information and the lens ID information are transmitted to the camera CPU 210 by initial communication performed during attachment to the image pickup apparatus 200. The camera CPU 210 causes the storage unit 211 to store the received information.

The image pickup apparatus 200 according to the present exemplary embodiment has a function for correcting the in-focus position based on the detection result of the focus detection unit 207 by using a correction amount set by the user and driving the focus lens to the corrected in-focus position (hereinafter referred to as "AF micro adjustment").

The user sets a value for setting the correction amount from a plurality of values. The image pickup apparatus 200 acquires the correction amount based on the set value and sets the acquired correction amount as the correction amount of the focal point shift amount. The correction amount corresponding to the plurality of values as candidates for the value set by the user is acquired based on the open F-number and the permissible confusion circle diameter. As described in detail below, in the present exemplary embodiment, when the user sets the value, the display unit 212 displays a scale mark indicating a scale as illustrated in FIG. 4. Accordingly, values that can be set by the user (i.e., candidate values for the value to be set) are hereinafter referred to as scale values.

Figure 2:
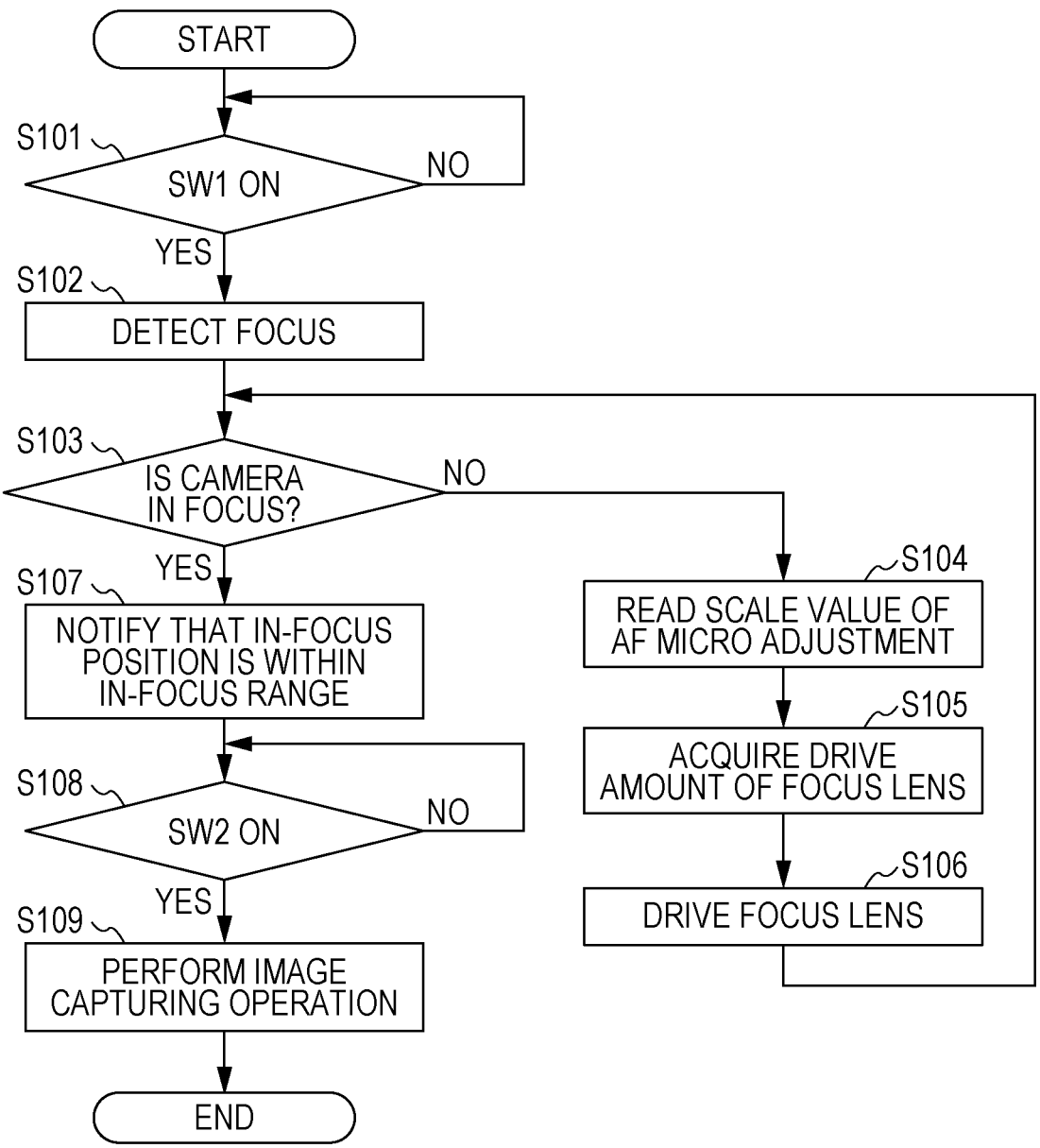
FIG. 2 is a flowchart illustrating shooting processing to which AF micro adjustment according to one or more aspects of the present disclosure.

FIG. 2 is a flowchart illustrating shooting processing to which the AF micro adjustment is applied. The user operates an operation unit, which is not illustrated, thereby enabling setting whether to enable the AF micro adjustment function. When the user sets the AF micro adjustment function to be enabled, the processing illustrated in FIG. 2 is executed. Shooting processing according to the present exemplary embodiment is executed by the camera CPU 210, which is a control unit according to the present exemplary embodiment, according to a processing program stored in the storage unit 211. The processing program may be stored in, for example, a computer-readable recording medium.

In step S101, the camera CPU 210 determines whether the SW 1 is turned on when the release button, which is an operation member, is half pressed. If the SW 1 is turned on, the processing proceeds to step S102. If the SW 1 is not turned on, the loop to step S101 is repeated.

In step S102, the camera CPU 210 causes the focus detection unit 207 to detect an in-focus position. Thus, information indicating a deviation between the current in-focus position and the in-focus position (e.g., a phase shift amount or defocus amount) is acquired.

In step S103, the camera CPU 210 determines whether the camera is focused on the detected in-focus position. The in-focus determination method is not particularly limited, as long as it can be determined whether the in-focus position detected in step S102 falls within a predetermined in-focus range by using a known AF algorithm. For example, when the defocus amount is acquired by focus detection, it can be determined whether the current in-focus position falls within the in-focus range based on the absolute value of the defocus amount. If it is determined that the current in-focus position is out of the in-focus range, the processing proceeds to step S104. If it is determined that the current in-focus position falls within the in-focus range, the processing proceeds to step S107.

If it is determined that the in-focus position detected in step S102 is out of the in-focus range, there is a need to drive the focus lens 101 to adjust the in-focus position.

In step S104, the camera CPU 210 reads the set scale value of the AF micro adjustment from the storage unit 211. When the storage unit 211 stores the correction amount instead of the scale value, the correction amount may be read.

In step S105, the camera CPU 210 acquires the drive amount of the focus lens 101 based on information indicating a deviation between the in-focus position detected in step S102 and the in-focus position and the correction amount corresponding to the scale value read in step S104. The correction amount corresponding to the scale value can be acquired by multiplying the scale value by a constant multiple (value set as a scale interval) of the focal depth. For example, when the correction amount per stage of the scale value is set to a ⅒ multiple of the focal depth, (scale value)×(focal depth)×⅒=(correction amount) holds.

In step S106, the camera CPU 210 causes the lens driving mechanism 102 to drive the focus lens 101 through the lens control circuit 103 based on the drive amount of the focus lens 101 obtained in step S105. After that, processing for returning to step S103 is carried out. The processing may proceed to step S107 without performing the in-focus determination.

If it is determined from the result obtained from the focus detection unit 207 that the current state is the in-focus state, the camera CPU 210 notifies the user that the in-focus position falls within the in-focus range (i.e., the camera is in focus) in step S107. Methods for notifying the user that the in-focus position falls within the in-focus range include producing sound by the sound production unit 214, and blinking or lighting display within a finder.

In step S108, the camera CPU 210 determines whether the user has fully pressed the release button to turn on the SW 2. If the SW 2 is turned on, the processing proceeds to step S109 to perform the image capturing operation. The image capturing operation is a series of operations as described below. That is, the main mirror 201 and the sub-mirror 202 are moved to the second state in which the main mirror 201 and the sub-mirror 202 are retracted to the outside of the photographic optical path, and the focal plane shutter 208 is opened to cause the light beam from the imaging lens to be incident on the image pickup element 209. After the image pickup element 209 is exposed to light for a predetermined period of time, the focal plane shutter 208 is closed to return the main mirror 201 and the sub-mirror 202 to the first state, and images obtained by the image pickup element 209 are stored. On the other hand, if the SW 2 is not turned on, the loop to step S108 is repeated.

As described above, the drive amount of the focus lens 101 is corrected based on the correction amount set in the AF micro adjustment, thereby enabling the user to perform fine adjustment of the in-focus position.

Next, an example of processing for setting the correction amount in the AF micro adjustment according to the present exemplary embodiment will be described with reference to FIG. 3.

Figure 3:
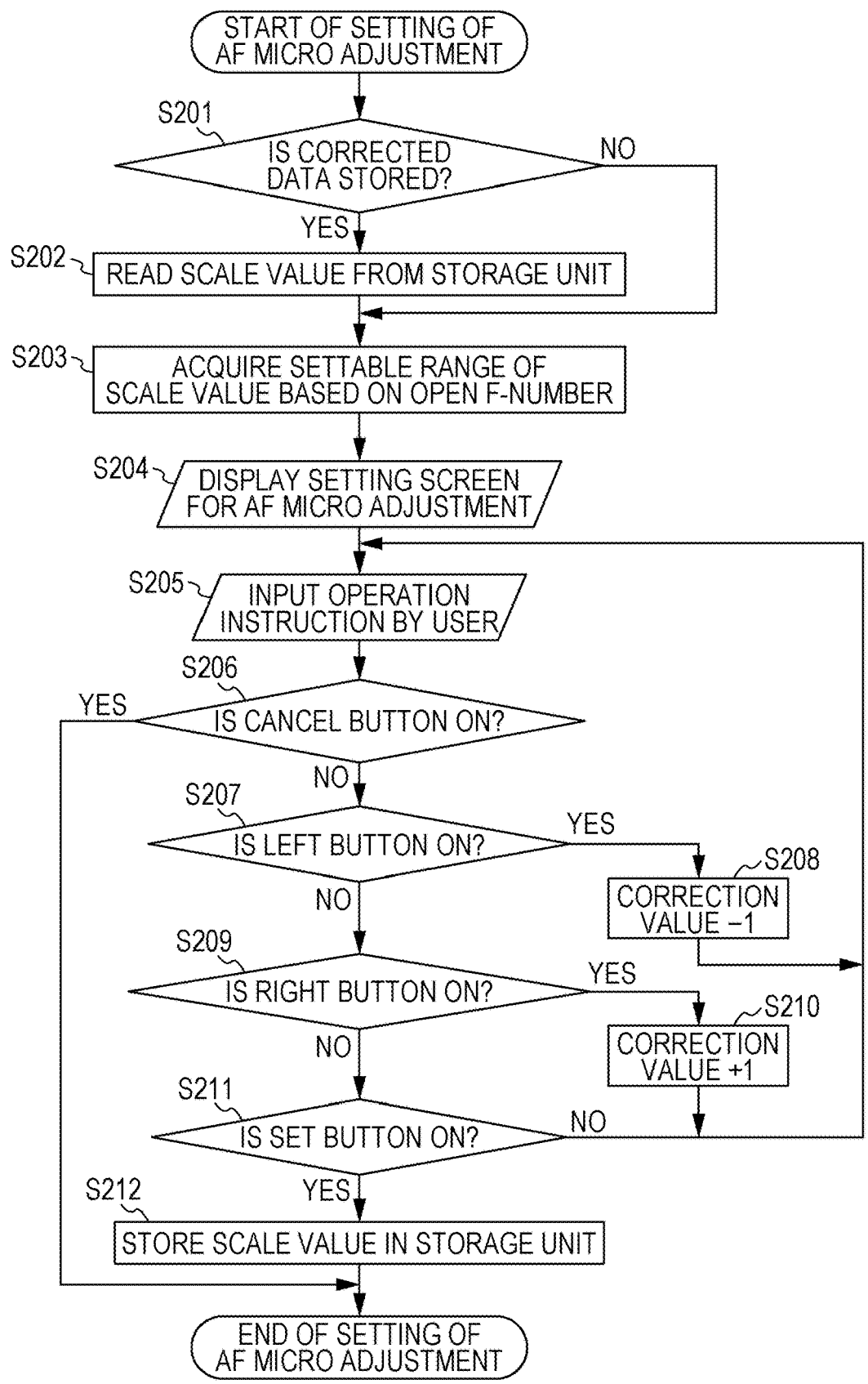
FIG. 3 is a flowchart illustrating an example of processing for setting a scale value in AF micro adjustment according to one or more aspects of the present disclosure.

FIG. 3 is a flowchart illustrating an example of processing for setting the correction amount in the AF micro adjustment. The user operates the operation unit, which is not illustrated, in a shooting standby state, thereby enabling AF micro adjustment setting processing. As described above, when the user sets the AF micro adjustment function to be enabled, the processing illustrated in FIG. 3 is carried out. The processing illustrated in FIG. 3 is carried out in such a manner that the camera CPU 210 controls each unit. When the processing for setting the correction amount in the AF micro adjustment is started, first, in step S201, the camera CPU 210 verifies whether the storage unit 211 stores the scale value corresponding to the attached imaging lens unit 100 by referring to the data stored in the storage unit 211. If the scale value is not stored, the processing proceeds step S203. If the scale value is stored, the correction amount data stored in the storage unit 211 is read in step S202. The storage unit 211 may store information indicating the correction amount, instead of the scale value corresponding to the imaging lens unit 100. In this case, it is verified in this step whether information about the correction amount corresponding to the attached imaging lens unit 100 is stored.

In step S203, the camera CPU 210 determines the range of settable scale values based on the open F-number of the attached imaging lens unit 100. Specifically, the range of settable scale values is determined in such a manner that the range is narrowed as the open F-number increases. The method for determining the range of settable values is not particularly limited as long as the range of settable scale values when an imaging lens unit having an open F-number corresponding to a second value (the second value is a value greater than a first value) is attached is narrower than that when an imaging lens unit having an open F-number corresponding to the first value is attached. In the present exemplary embodiment, information indicating the relationship between the open F-number and the range of settable scale values as illustrated in FIG. 6 is stored in the storage unit 211 and the range of settable values is determined by referring to the information in this step. Instead of using this table, a range of scale values that can be input may be calculated using a function including an open F-number as a variable. Information about the open F-number of the attached imaging lens unit may be received from the imaging lens unit, or may be acquired by receiving lens ID information from the imaging lens unit and reading the open F-number corresponding to the lens ID from the storage unit. An advantageous effect of changing the range of settable scale values based on the open F-number will be described below.

In step S204, the camera CPU 210 controls the display unit 212 in such a manner that a setting screen for the AF micro adjustment as illustrated in FIG. 4 is displayed on the display unit 212. In this case, the range of scale values that can be input is displayed after changing the range according to the open F-number of the imaging lens unit.

Each display item will be described with reference to FIG. 4. A mode display unit 301 displays the current mode of the image pickup apparatus 200. A lens information display unit 302 displays the names and characteristics of the imaging lens unit 100 and the conversion lens that are attached to the image pickup apparatus 200. FIG. 4 illustrates an example in which a focal length (50 mm) and an open F-number (1.2) are displayed. If the imaging lens unit 100 or the like is not attached to the image pickup apparatus 200, a warning is displayed. A scale mark 303 indicates a scale value used for setting the correction amount. The correction amount per stage of the scale value is set based on the focal depth, and is set to a constant multiple (a value less than 1 is generally used) of the focal depth that is determined based on the open F-number and the permissible confusion circle diameter of the attached imaging lens unit 100. In the example of FIG. 4, the scale value can be set by scale in a range of ±20 scales. An index 304 is displayed at a position indicating the scale value input by the user. FIG. 4 illustrates the initial state, i.e., that the scale value is 0, and thus the index 304 is displayed at a position of ±0. If the scale value is read from the storage unit 211 in step S202, the index 304 is displayed at the position corresponding to the read scale value. A display 305 notifies the user that the scale value setting processing is completed when a SET button (not illustrated) is pressed. A display 306 notifies the user that the scale value setting processing is cancelled when a cancel button (not illustrated) is pressed.

FIG. 5 illustrates an example of a screen displayed on the display unit 212 when the imaging lens unit 100 having a large open F-number is attached. The setting screen illustrated in FIG. 5 is the same as the setting screen illustrated in FIG. 4, except for the lens information and the range of settable scale values displayed on the lens information display unit 302. FIG. 5 illustrates a case where a 2-power teleconversion lens is attached to an imaging lens unit having a focal length of 600 mm and an open F-number of 4.0 as an example of the imaging lens unit having a large open F-number. In this example, the open F-number is F8.0. Accordingly, the range of settable scale values is limited to ±10 based on the table illustrated in FIG. 6.

In step S204 and subsequent steps, the user uses the operation member to set the scale value while viewing the screen displayed on the display unit 212. The operation member may be a touch panel.

In step S206, the camera CPU 210 determines whether the cancel button is operated. If the cancel button is operated, the scale value setting processing is terminated and then the AF micro adjustment setting processing is terminated. If the cancel button is not operated, the processing proceeds to step S207.

In step S207, the camera CPU 210 determines whether a left button of the operation member is operated. If the left button is operated, the processing proceeds to step S208 to move the scale value by −1 from the current value. In accordance with this movement, the index 304 illustrated in FIG. 4 is moved by one scale to the left side. If the left button is not operated, the processing proceeds to step S209.

In step S209, the camera CPU 210 determines whether a right button of the operation member is operated. If the right button is operated, the processing proceeds to step S210 to move the scale value from the current value by +1. In accordance with this movement, the index 304 illustrated in FIG. 4 is moved by one scale to the right side. If the right button is not operated, the processing proceeds to step S211.

In step S211, it is determined whether the SET button of the operation member is operated. If the SET button is operated, it is determined that setting of the scale value is completed and the scale value input in step S212 is stored in the storage unit 211. If the scale value corresponding to the imaging lens unit 100 is stored in the storage unit, a warning may be displayed to the user through the display unit 212 before storing the scale value. If the scale value corresponding to the imaging lens unit 100 is stored in the storage unit, the stored scale value is updated by the currently set scale value. If the SET button is not operated, the processing returns to step S205.

The camera CPU 210 carries out the above-described processing flow to thereby function as a setting unit capable of setting the scale value from a plurality of values and as a control unit for acquiring the correction amount and adjusting the focal point shift amount of the lens unit based on the scale value and the information about the lens unit. A part or the whole of the functions of the camera CPU 210 may be implemented by a control circuit.

Next, the advantageous effect of changing the range of settable scale values according to the open F-number of the imaging lens unit 100 will be described.

As described above, FIG. 5 illustrates a case where a 2-power teleconversion lens is attached to an imaging lens unit having a focal length of 600 mm and an open F-number of 4.0 as an example of the imaging lens unit having a large open F-number. The open F-number is F8.0. The correction amount of the AF in-focus position is set in units of constant multiple of the focal depth. In this example, since the focal depth is 240 μm, assuming that one scale is one tenth (1/10) the focal depth and the range of settable scale values is ±20 scales, a correction amount of ±480 μm can be set at maximum in a state where the correction amount is not set (i.e., the scale value is 0). The AF micro adjustment function is originally intended to correct the in-focus position by about several tens of μm, and thus it is unusual that such a large correction amount is required. Accordingly, the inventor of the present disclosure has found that, if such a large correction amount can be set, defocusing is likely to occur against user's intention.

Therefore, the image pickup apparatus 200 according to the present exemplary embodiment changes the range of settable scale values according to the open F-number of the attached imaging lens unit 100 so as to prevent setting of a scale value corresponding to a large correction amount. Even in a case where the same imaging lens unit as that illustrated in FIG. 5 is used, if the open F-number of 600/4.0 using no extender is 600/4.0, the open F-number is 4.0. Accordingly, the range of settable scale values is ±15. In the present exemplary embodiment, scale values that are out of the range (equal to or less than −11 and equal to or more than +11 in the example of FIG. 5) as illustrated in FIG. 5 is not displayed so as to notify the user that the scale values that are out of the range of settable values cannot be set.

As described above, in the present exemplary embodiment, the range of scale values that can be input and used for setting the correction amount is changed according to the open F-number of the attached imaging lens unit. Further, the display of the range for inputting the scale value is changed according to the open F-number. Thus, setting of a large unrecommended correction amount can be limited. Consequently, it is possible to provide a camera and an image pickup system which are capable of reducing incorrect setting by the user and facilitating setting of an appropriate AF correction amount.

The present exemplary embodiment illustrates an example in which the currently set scale value is displayed with respect to the scale mark indicating the range of settable values. However, the present disclosure can be applied in the same manner as the present exemplary embodiment, as long as any setting value can be selected by the user from among a plurality of candidate values. For example, only the currently set value may be displayed on the setting screen without displaying the range of settable values. The value set before the correction value adjustment mode is currently available may be displayed so that the value can be referenced.

Second Exemplary Embodiment

A second exemplary embodiment of the present disclosure (hereinafter referred to as the second exemplary embodiment) will be described with reference to FIGS. 7A to 7C. The present exemplary embodiment is similar to the first exemplary embodiment, except for notifying a user that a set value is in an unrecommended scale value range, instead of disabling setting of an unrecommended scale value, and thus detailed descriptions thereof are omitted.

Figure 7A:
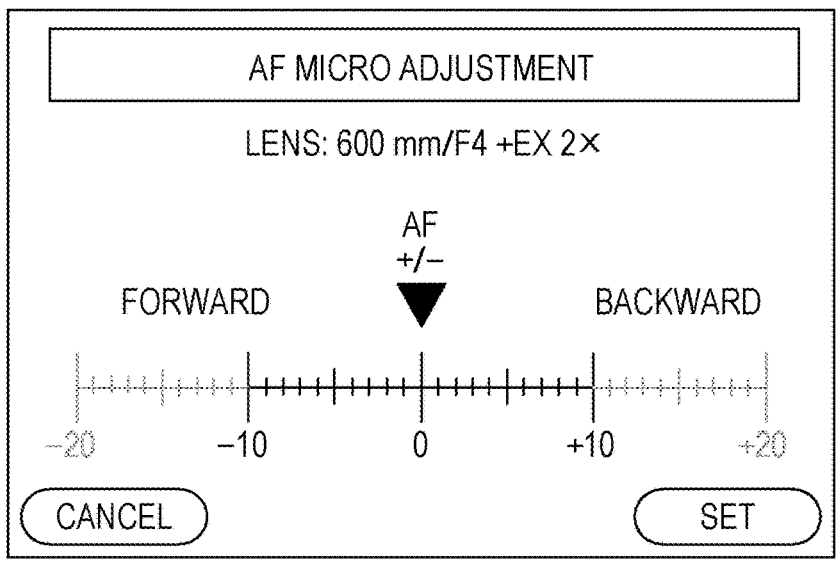
FIGS. 7A to 7C are diagrams each illustrating an example of a screen displayed on a display unit when a scale value is set in AF micro adjustment according to one or more aspects of the present disclosure.
Figure 7B:
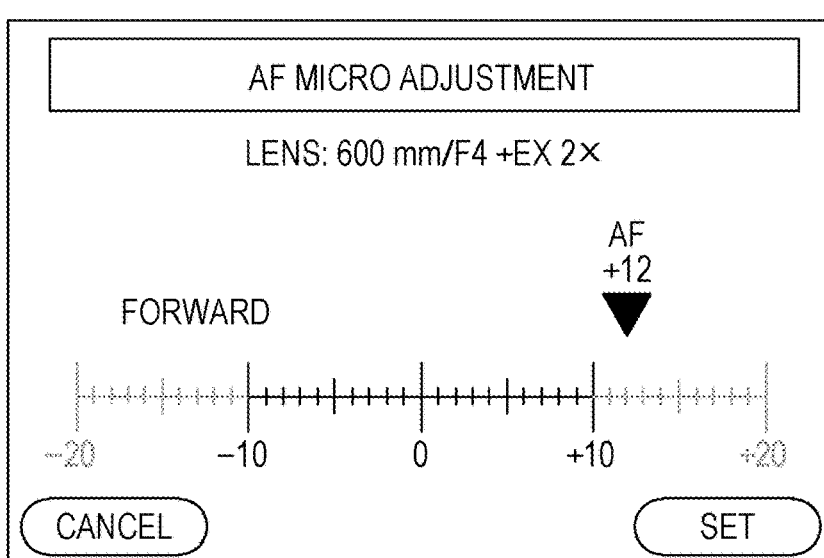
Figure 7C:
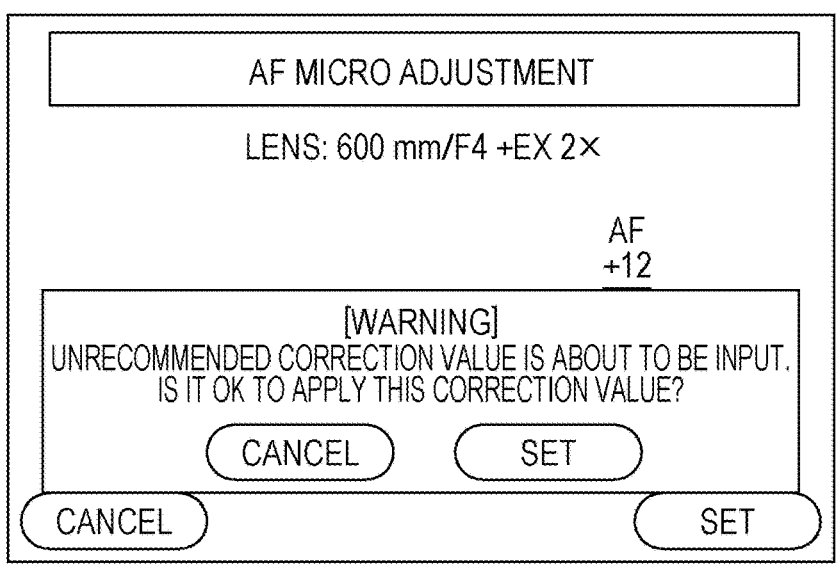

FIGS. 7A to 7C are diagrams each illustrating a display on the display unit 212 when an imaging lens having a large open F-number is attached in the present exemplary embodiment. Like in the first exemplary embodiment, FIGS. 7A to 7C illustrate a case where 600/4.0×2 is attached. FIG. 7A is a screen displayed on the display unit 212 in step S204. Unlike in the first exemplary embodiment, a range of scale values (equal to or less than −11 and equal to or more than +11 in this case) corresponding to a large correction amount is displayed in a manner (grayout) different from that for the other ranges. Thus, the ranges are displayed in different ways, thereby displaying the ranges to enable the user to distinguish a range of setting values that are not recommended (the range is referred to as a second range) from a range of recommended setting values (the range is referred to as a first range). In other words, the image pickup apparatus 200 according to the present exemplary embodiment displays, in a distinguishable manner, the first range and the second range including a range larger than an upper limit (+10 in this case) of the first range and a range smaller than a lower limit (−10 in this case) of the first range. As illustrated in FIG. 7B, when the SET button is input in a state where the index 304 indicates the scale value within the second range, the camera CPU 210 controls the display unit 212 to display a warning screen for verification as illustrated in FIG. 7C.

In this manner, in the present exemplary embodiment, the unrecommended scale value range and the recommended scale value range are displayed in a visually distinguishable manner. When a scale value within the second range, which is the unrecommended scale value range, is to be set, a warning is displayed. Thus, it is possible to reduce setting of a scale value corresponding to a large correction amount due to incorrect setting by the user. However, for example, when it is intended to perform shooting with a large front focus, the value is input regardless of the warning, thereby making it possible to set a large AF correction amount. FIGS. 7A to 7C illustrate an example of the setting screen when the open F-number is large and the second range is set. However, when the open F-number is equal to or less than a predetermined value, the second range is not set and the setting screen illustrated in FIG. 4 is displayed. The range of settable scale values according to the first exemplary embodiment corresponds to the first range according to the present exemplary embodiment. Accordingly, for example, in a case where the first range and the second range are set using the table illustrated in FIG. 6, when an imaging lens unit having an open F-number equal to or less than 2.8 is attached, the second range is not set.

Third Exemplary Embodiment

A third exemplary embodiment of the present disclosure (hereinafter referred to as the third exemplary embodiment) will be described with reference to FIGS. 8 and 9A to 9D. The present exemplary embodiment is similar to the first exemplary embodiment, except that the present exemplary embodiment is an image pickup apparatus having a function for automatically setting a scale value for AF micro adjustment, and thus detailed descriptions thereof are omitted.

Figure 8B:
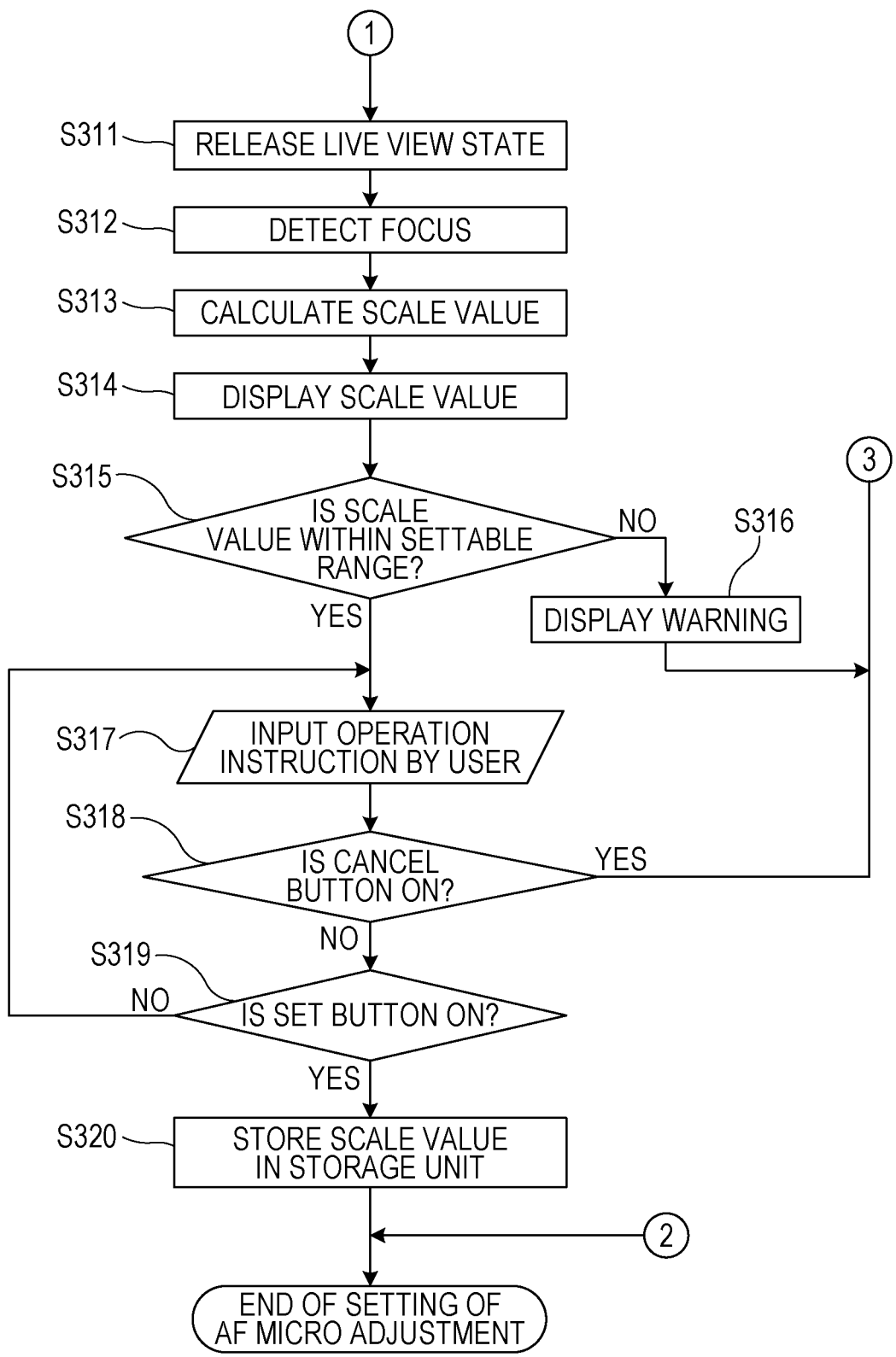
FIG. 8 includes FIGS. 8A and 8B which are flowcharts illustrating an example of processing for setting a scale value in AF micro adjustment according to one or more aspects of the present disclosure.

FIGS. 8A and 8B are flowcharts illustrating an example of processing for setting a scale value in AF micro adjustment according to the third exemplary embodiment. The processing illustrated in FIGS. 8A and 8B is executed in such a manner that the CPU 210 controls each unit.

Steps S301 to S303 are respectively similar to steps S201 to S203 according to the first exemplary embodiment, and thus detailed descriptions thereof are omitted. In steps S301 to 303, when the scale value corresponding to the attached imaging lens unit 100 is stored, the scale value is read and the range of settable scale values is determined based on the open F-number.

In step S304, the camera CPU 210 shifts the camera to a live view state. In the live view state, the image pickup element 209 acquires a moving image. Accordingly, the main mirror 201 and the sub-mirror 202 are moved to the second state in which the main mirror 201 and the sub-mirror 202 are retracted to the outside of the photographic optical path, and the focal plane shutter 208 is opened to cause the light beam from the imaging lens to be incident on the image pickup element 209.

Figure 9A:
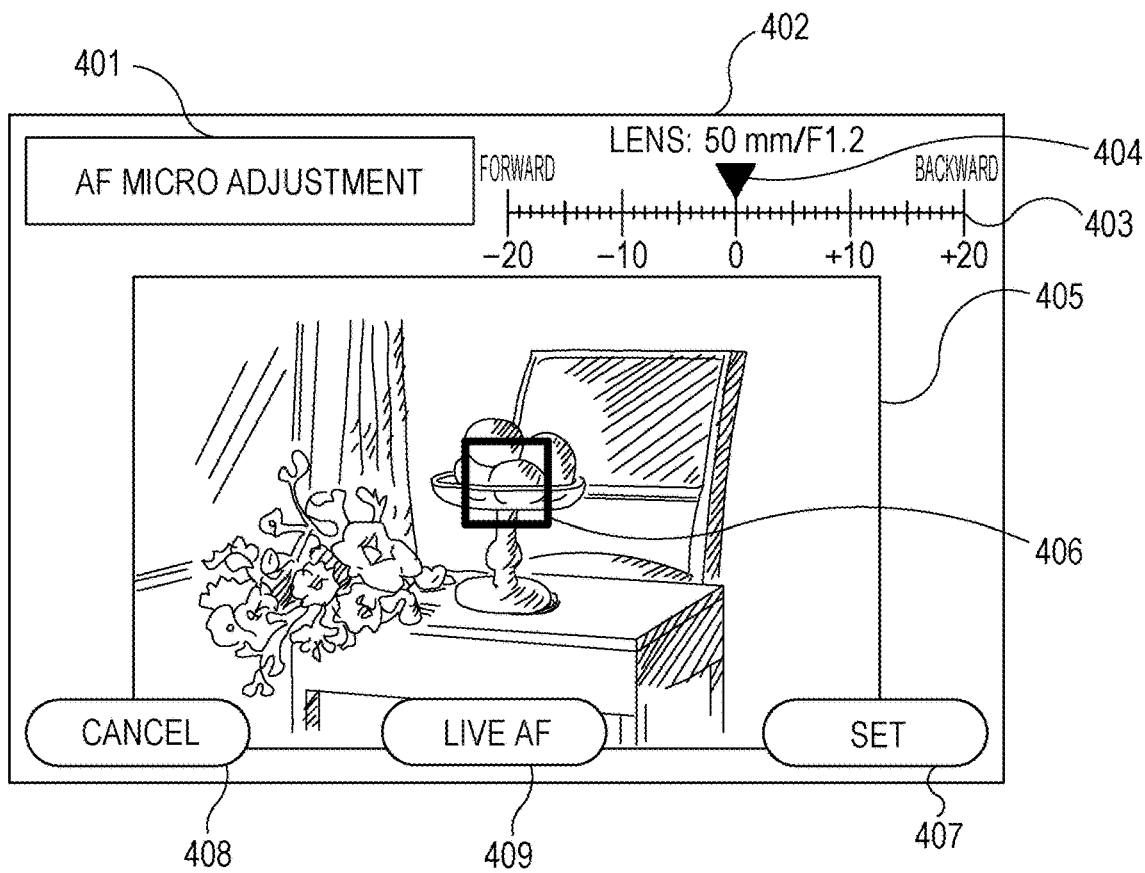
FIGS. 9A to 9D are diagrams each illustrating an example of a screen displayed on a display unit when a scale value is set in AF micro adjustment according to one or more aspects of the present disclosure.

In step S305, the camera CPU 210 causes the display unit 212 to display the setting screen for AF micro adjustment as illustrated in FIG. 9A. FIGS. 9A to 9D are diagrams each illustrating an example of the screen displayed on the display unit 212 when the scale value is set in AF micro adjustment setting processing according to the third exemplary embodiment.

Each display item will be described with reference to FIG. 9A. A mode display unit 401 to an index 404 are respectively similar to the mode display unit 301 to the index 304 illustrated in FIG. 4, and thus detailed descriptions thereof are omitted. The mode display unit 401 displays the current mode of the image pickup apparatus 200. The lens information display unit 402 displays the names and characteristics of the attached imaging lens unit 100 and the conversion lens. In the present exemplary embodiment, if the imaging lens unit 100 or the like is not attached to the image pickup apparatus 200, the AF micro adjustment cannot be set. Accordingly, if the imaging lens unit 100 or the like is not attached, a warning is displayed. The scale mark 403 indicates a scale value used for setting the correction amount. In the example of FIG. 9A, the scale value can be set by scale in a range of ±20 scales. The scale mark 403 is displayed in such a manner that the display range of the scale is limited like in the first exemplary embodiment, or a partial range is visually distinguished like in the second exemplary embodiment, depending on the open F-number and the permissible configuration circle diameter of the attached imaging lens unit 100. The index 404 is displayed at a position indicating the scale value input by the user. When the camera CPU 210 reads the scale value from the storage unit 211 in step S302, the index 404 is displayed at the position corresponding to the read scale value. A live view image 405 is a moving image obtained by the image pickup element 209. An AF frame 406 indicating an AF range indicates the same range as the position where focus detection is performed by the focus detection unit 207.

A display 407 notifies the user that the processing proceeds to the subsequent step when the SET button (not illustrated) is pressed. A display 408 notifies the user that the scale value setting processing is cancelled when the cancel button (not illustrated) is pressed. A display 409 notifies the user that a live AF operation, which is described below, is performed when the SW 1 is turned on.

Figure 9B:
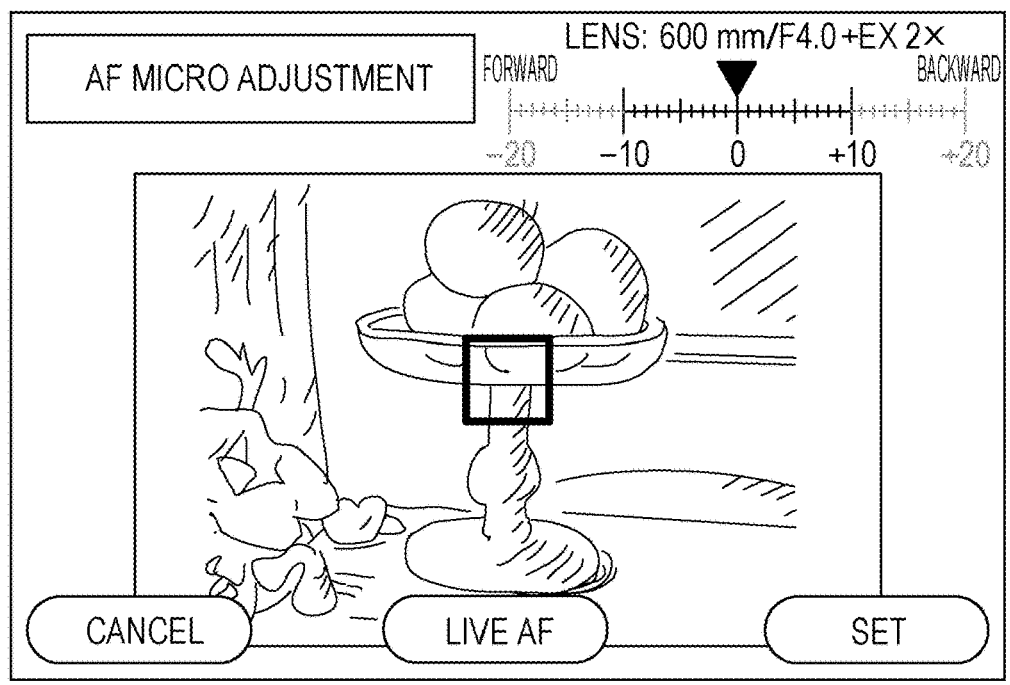

FIG. 9B illustrates an example of the screen displayed on the display unit 212 when the imaging lens unit 100 having a large open F-number is attached. The setting screen illustrated in FIG. 9B is the same as the setting screen illustrated in FIG. 9A, except for the lens information and the range of settable scale values displayed on the lens information display unit 402. FIG. 9B illustrates a case where a 2-power teleconversion lens is attached to an imaging lens unit having a focal length of 600 mm and an open F-number of 4.0 as an example of the imaging lens unit having a large open F-number. In this case, the open F-number is F8.0. Accordingly, the range of settable scale values is limited to ±10 based on the table illustrated in FIG. 6.

In step S306 and subsequent steps, the user uses the operation member to set the scale value while viewing the screen displayed on the display unit 212. The operation member may be a touch panel.

In step S307, the camera CPU 210 determines whether the cancel button is operated. If the cancel button is operated, the processing is terminated and then the AF micro adjustment setting processing is terminated. If the cancel button is not operated, the processing proceeds to step S308.

In step S308, the camera CPU 210 determines whether a live AF button is operated. If the live AF button is operated, the processing proceeds to step S309. If the live AF button is not operated, the processing proceeds to step S310.

In step S309, the camera CPU 210 performs the live AF operation. The live AF operation refers to focus detection based on a moving image obtained by the image pickup element 209. In the live AF operation, known contrast AF and imaging plane phase difference AF are carried out. The present exemplary embodiment illustrates an example in which the live AF operation is carried out using contrast AF. In the example of FIG. 9A, the position of the focus lens 101 is determined so that the contrast evaluation value of the moving image within the range of the AF frame 406 is maximized. After completion of the live AF operation, the processing proceeds to step S306 to be ready for receiving a user's operation again.

In step S310, the camera CPU 210 determines whether the SET button is operated. The user verifies whether the subject is focused in the live view image 405. If the subject is focused, the SET button is operated. If the SET button is operated, the processing proceeds to step S311. If the SET button is not operated, the processing returns to step S306 to be ready for receiving a user's operation again.

In step S311, the camera CPU 210 releases the live view state. Specifically, the main mirror 201 and the sub-mirror 202 are returned to the first state from the second state in which the main mirror 201 and the sub-mirror 202 are retracted to the outside of the photographic optical path, and the focal plane shutter 208 is closed. Thus, the image pickup apparatus 200 is capable of performing focus detection by the focus detection unit 207.

In step S312, the camera CPU 210 causes the focus detection unit 207 to detect an in-focus position. Thus, information indicating a deviation between the current in-focus position and the in-focus position (e.g., a phase shift amount or a defocus amount) is acquired.

In step S313, the camera CPU 210 calculates the scale value based on the defocus amount acquired in step S312. In step S310, the user verifies that the subject is focused in the live view image 405. On the other hand, the defocus amount is acquired from the focus detection unit 207 in step S312. If the defocus amount acquired from the focus detection unit is not 0, the imaging lens to be used is required to perform a fine adjustment of the in-focus position. Accordingly, the correction amount in the AF micro adjustment function is automatically set according to the detected defocus amount. In this case, the correction amount corresponds to the acquired defocus amount. Since the focal depth of the imaging lens (the open F-number and the permissible confusion circle diameter) is known, the scale value corresponding to the correction amount can be calculated by performing a back-calculation from a formula for acquiring the correction amount from the scale value. For example, as described above, when (correction amount)=(scale value)×(focal depth)×1/10 holds, the scale value corresponding to the correction amount is represented by (correction amount)/(focal depth)×10. At this time, when the calculated correction value includes a decimal point, the correction value to be displayed to the user is rounded by rounding off, rounding down, or rounding up. However, when the camera CPU 210 treats the correction value as internal processing, a value including a decimal point may be treated. This leads to an increase in the accuracy of the correction value.

Figure 9C:
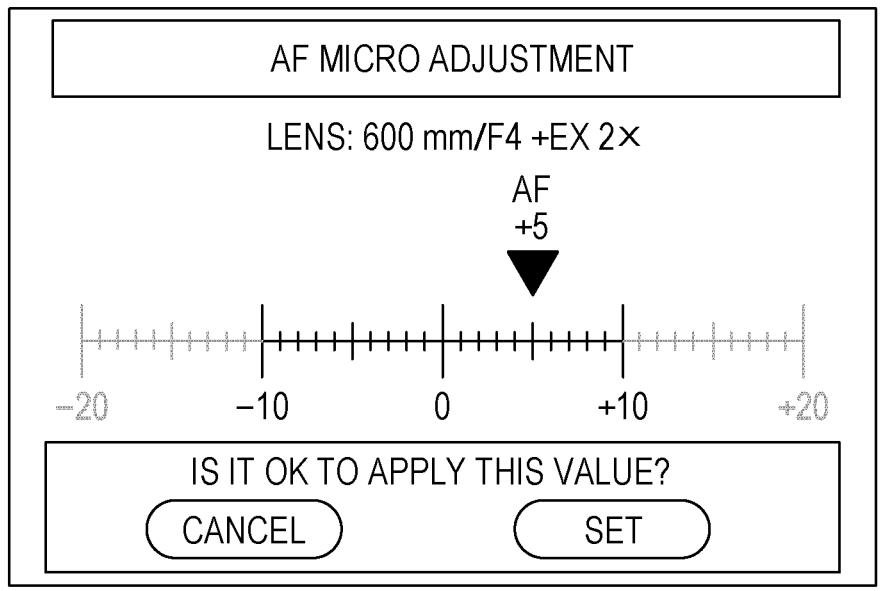

In step S314, the camera CPU 210 causes the display unit 212 to display the calculated scale value. FIG. 9C illustrates an example of the display screen of the display unit 212 at this time. Specifically, when the SET button 407 is operated in step S310, the display screen illustrated in FIG. 9A or FIG. 9B is switched to the display screen illustrated in FIG. 9C. The imaging lens to be used has the same configuration as that illustrated in FIG. 9B, and the range of settable scale values is limited to ±10.

In step S315, the camera CPU 210 determines whether the scale value calculated in step S313 falls within the range of settable scale values preliminarily set according to the open F-number of the imaging lens. If the calculated scale value falls within the range of settable values, the processing proceeds to step S317. If the calculated scale value is out of the range of settable values, the processing proceeds to step S316.

Figure 9D:
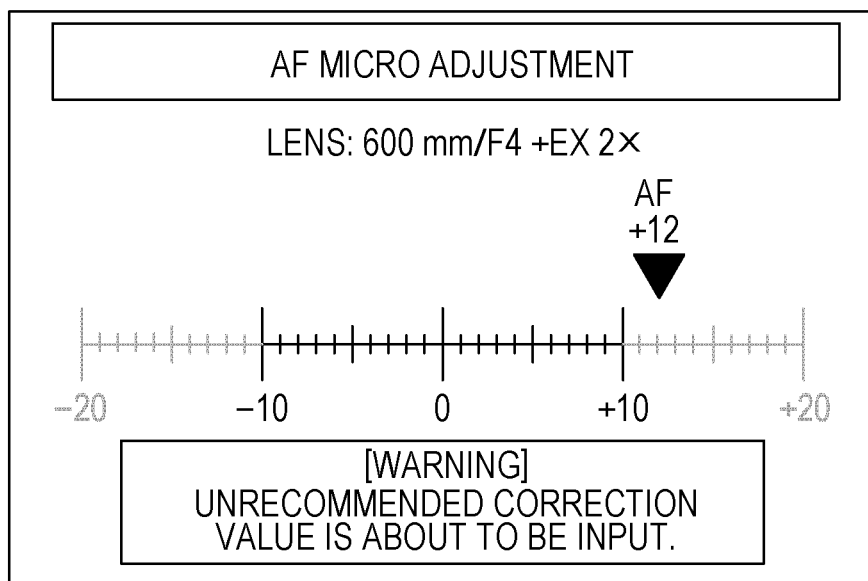

In step S316, the camera CPU 210 causes the display unit 212 to display a warning to notify the user that the scale value to be set is out of the range of recommended values. FIG. 9D illustrates the display performed at this time. After the warning is displayed for a predetermined period of time, the processing automatically returns to step S304 to set a focus from the live view state again. Instead of automatically returning to step S304, if an instruction for permitting the input of an unrecommended correction value is received from the user after the warning is displayed, the correction value may be input.

In step S317, the user's operation is received. In step S318, the camera CPU 210 determines whether the cancel button is operated. If the cancel button is operated, the processing returns to step S304 to perform the AF micro adjustment setting again. If the cancel button is not operated, the processing proceeds to step S319 and the camera CPU 210 determines whether the SET button is operated. If the SET button is operated, it is determined that the setting of the scale value is completed and the scale value input in step S320 is stored in the storage unit 211. When the storage unit stores the scale value corresponding to the imaging lens unit 100, a warning may be displayed to ask the user if the scale value may be overwritten and stored through the display unit 212 before storing the scale value.

Thus, in the present exemplary embodiment, the scale value for setting the correction amount is automatically set using the live AF by the image pickup element 209. Like in the first and second exemplary embodiments, the range of scale values that can be input is changed or limited according to the open F-number of the imaging lens. Consequently, it is possible to provide a camera and an image pickup system which are capable of reducing incorrect setting by the user and facilitating setting of an appropriate AF correction amount.

While the present exemplary embodiment illustrates a case where the live AF is used as a focus adjustment method, the present disclosure is not limited to this method. For example, the focus adjustment may be performed by verifying the live view image while manually operating the focus lens 101 of the imaging lens. In this case, the focus adjustment may be manually performed during steps S305 to S310 in the flowchart of FIG. 8A and the subsequent processing may be performed in a manner similar to that when the live AF is used.

Fourth Exemplary Embodiment

A fourth exemplary embodiment of the present disclosure (hereinafter referred to as the fourth exemplary embodiment) will be described with reference to FIGS. 10 and 11. In the present exemplary embodiment, setting of the scale value for AF micro adjustment is performed in such a manner that the user selects the most in-focus image from among images captured while changing the position of the focus lens 101 stepwise (hereinafter referred to as focus bracket shooting). The other features of the fourth exemplary embodiment are similar to those of the first exemplary embodiment, and thus detailed descriptions thereof are omitted.

Figure 10B:
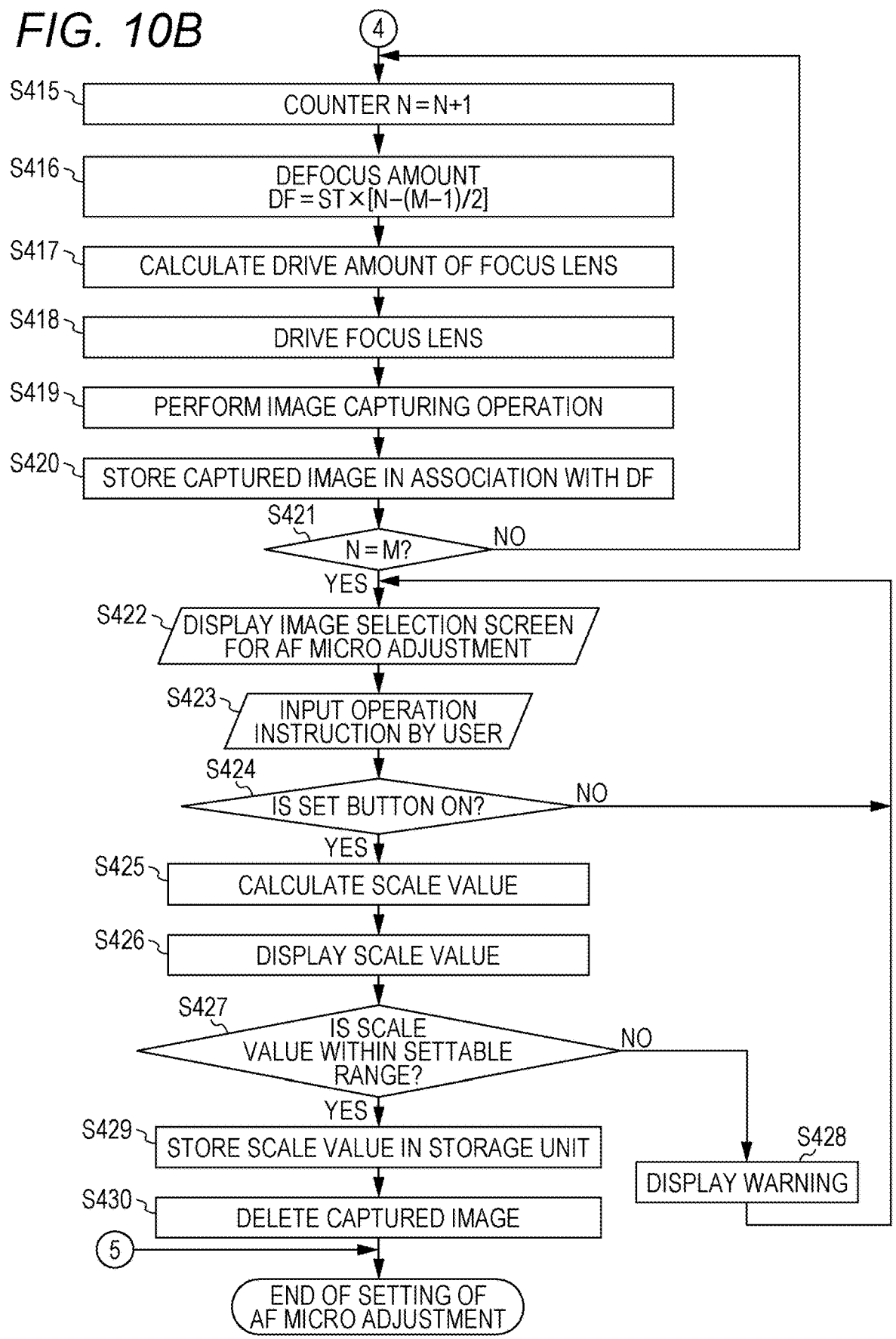
FIG. 10 includes FIGS. 10A and 10B which are flowcharts illustrating an example of processing for setting a scale value in AF micro adjustment according to one or more aspects of the present disclosure.

FIGS. 10A and 10B are flowcharts illustrating an example of processing for setting a scale value in AF micro adjustment according to the fourth exemplary embodiment. The processing illustrated in FIGS. 10A and 10B is performed in such a manner that the CPU 210 controls each unit.

Steps S401 to S403 are respectively similar to steps S201 to S203 according to the first exemplary embodiment, and thus detailed descriptions thereof are omitted. If the scale value corresponding to the imaging lens unit 100 is stored, the scale value is read and the range of settable scale values is determined based on the open F-number.

Figure 11A:
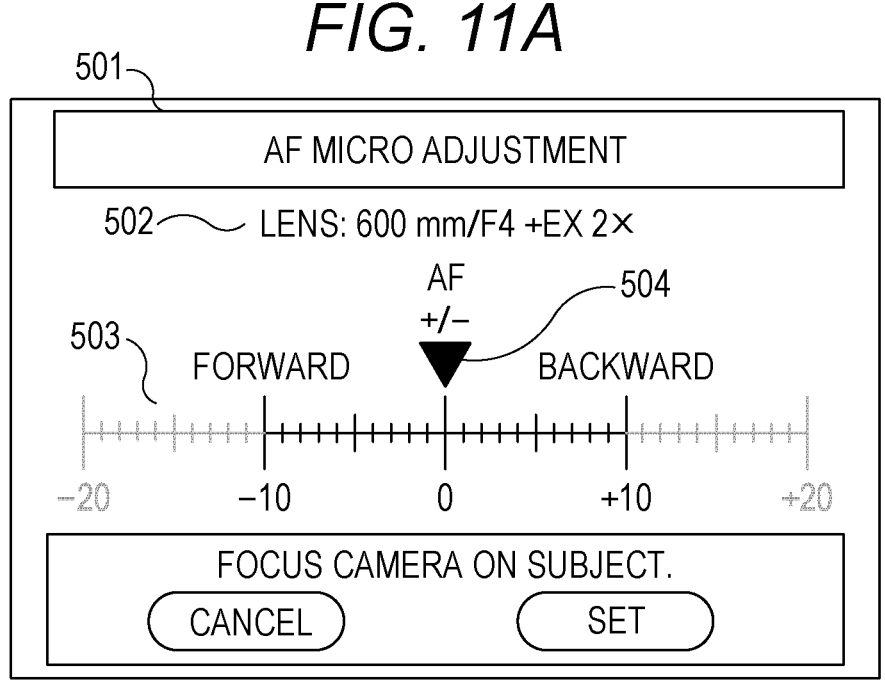
FIGS. 11A and 11B are diagrams each illustrating an example of a screen displayed on a display unit when a scale value is set in AF micro adjustment according to one or more aspects of the present disclosure.
Figure 11B:
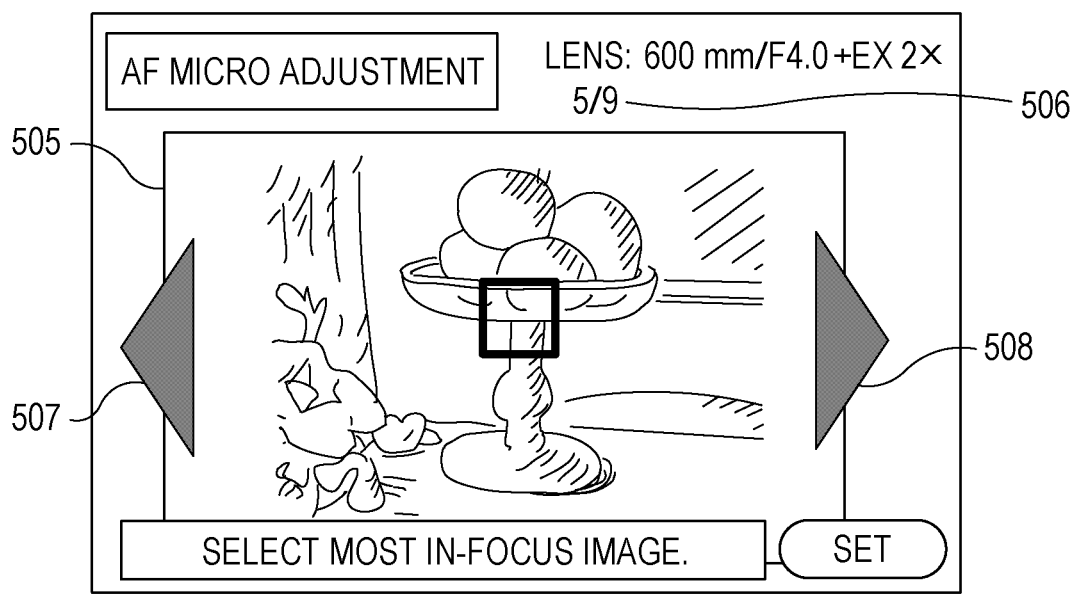

In step S404, the camera CPU 210 displays the setting screen for AF micro adjustment as illustrated in FIG. 11A on the display unit 212. FIGS. 11A and 11B are diagrams each illustrating an example of the screen displayed on the display unit 212 when the scale value is set in the AF micro adjustment according to the fourth exemplary embodiment.

Each display item will be described with reference to FIG. 11A. A mode display unit 501 to an index 504 are respectively similar to the mode display unit 301 to the index 304 on the setting screen according to the first exemplary embodiment, and thus detailed descriptions thereof are omitted. FIG. 11A illustrates an example where a 2-power teleconversion lens is attached to an imaging lens unit having a focal length of 600 mm and an open F-number of 4.0. Like in the third exemplary embodiment, in the present exemplary embodiment, if the imaging lens unit 100 is not attached to the image pickup apparatus 200, the AF micro adjustment cannot be executed, and thus a warning is displayed. Further, in the present exemplary embodiment, the range of settable scale values is limited to ±10. In FIG. 11A, the index 504 is displayed at the position of ±0 to indicate the initial state, i.e., that the scale value is 0. When the camera CPU 210 reads the scale value from the storage unit 211 in step S402, the index 504 is displayed at the position corresponding to the read scale value.

In step S404 and subsequent steps, the user uses the operation member to set the scale value while viewing the screen displayed on the display unit 212. The operation member may be a touch panel.

In step S406, the camera CPU 210 determines whether the cancel button is operated. If the cancel button is operated, the processing is terminated and then the AF micro adjustment setting processing is terminated. If the cancel button is not operated, the processing proceeds to step S407.

In step S407, the camera CPU 210 determines whether the SET button is operated. The user verifies whether the subject is focused by an optical finder in this state. If the subject is focused, the SET button is operated. If the subject is not focused, the SW 1 is pressed to instruct the AF, or focus adjustment is manually performed and then the SET button is operated.

If the SET button is operated, the processing proceeds to step S408. If the SET button is not operated, the processing returns to step S405 to be ready for receiving a user's operation again.

In step S408, the camera CPU 210 causes the focus detection unit 207 to detect an in-focus position. Thus, information indicating a deviation between the current in-focus position and the in-focus position (e.g., a phase shift amount or defocus amount) is acquired.

In step S409, the camera CPU 210 determines whether the camera is focused on the detected in-focus position. The in-focus determination method is not particularly limited, as long as it can be determined whether the in-focus position detected in step S408 falls within a predetermined in-focus range by using a known AF algorithm. For example, when the defocus amount is acquired by focus detection, it can be determined whether the current in-focus position falls within the in-focus range based on the absolute value of the defocus amount. If it is determined that the current in-focus position is out of the in-focus range, the processing proceeds to step S410. If it is determined that the current in-focus position falls within the in-focus range, the processing proceeds to step S412.

If the camera CPU 210 determines in step S409 that the detected in-focus position is out of the in-focus range, there is a need to drive the focus lens 101 to adjust the in-focus position so that the camera is brought into the in-focus state. In step S410, the camera CPU 210 acquires the drive amount of the focus lens 101 based on information indicating a deviation between the current in-focus position and the in-focus position detected in step S408.

In step S411, the lens driving mechanism 102 is caused to drive the focus lens 101 through the lens control circuit 103 based on the drive amount of the focus lens 101 obtained in step S410. After that, processing for returning to step S408 is carried out. The processing may proceed to step S412 without performing the in-focus determination. Further, for example, when the user manually performs the focusing operation, the processing may proceed to step S412 without performing the focus detection in step S408 and the in-focus determination in step S409.

Focus bracket shooting is performed in step S412 and subsequent steps.

In step S412, the camera CPU 210 acquires an initial value for a counter "N" indicating the number of captured images. The initial value is N=0.

In step S413, the camera CPU 210 acquires the number of "M" images acquired by focus bracket shooting. In the present exemplary embodiment, M=9 holds.

In step S414, the camera CPU 210 acquires a focus bracketing step amount "ST". The focus bracketing step amount refers to an interval of a defocus amount per shooting in the focus bracket shooting. In the present exemplary embodiment, the focus bracketing step amount ST is determined from the following formula.

$$ST = F \times \delta / [(M-1)/2]$$

where F represents the open F-number of the imaging lens, and δ represents the permissible confusion circle diameter of the imaging lens. In other words, F×δ is equal to the focal depth when the imaging lens unit 100 performs shooting with a maximum aperture. This F×δ is divided by (M−1)/2. Accordingly, M images are captured by changing defocus amounts by ST in a focus bracket range of 2Fδ. In the present exemplary embodiment, images are captured using the center of the focus bracket range (2Fδ) as the reference of the defocus amount. Further, a value obtained by equally dividing each of ranges before and after Fδ by (M−1)/2 is set as the step amount ST. In the present exemplary embodiment, M=9 holds. Accordingly, when the current focus position (in the vicinity of the in-focus position detected in step S408) is 0, shooting is performed at in-focus positions of ±1Fδ, ±¾Fδ, ±½Fδ, and ±¼Fδ. The focus bracket range is not limited to this range. For example, bracket shooting may be performed by moving the focus in a wider range when there is a possibility that a large deviation occurs. In step S415, the camera CPU 210 increments (counts up) a counter N by 1.

In step S416, the camera CPU 210 determines a defocus amount DF by the following formula so as to drive the focus lens 101. Since the focus bracketing step amount ST is determined in step S414, the defocus amount DF is obtained as follows.

$$DF = ST \times [N - (M-1)/2]$$

In the present exemplary embodiment, M=9 holds. Accordingly, an image captured at the focus lens position when DF=0 (value based on the defocus amount) in focus bracket shooting, four captured images when DF is negative, and four captured images when DF is positive are obtained.

In step S417, the camera CPU 210 calculates the movement amount of the focus lens 101 to be driven from the defocus amount DF calculated in step S416. The calculated movement amount is transmitted to the lens control circuit 103 and converted into the number of driving pulses to be given to the lens driving mechanism 102. The focus lens 101 is moved in step S418 based on the number of driving pulses.

In step S419, the camera CPU 210 controls the image capturing operation to be performed.

In step S420, the camera CPU 210 stores the captured images and the defocus amount DF in a storage medium, such as the storage unit 211, or a memory card, which is not illustrated, in such a manner that the captured images and the defocus amount DF are associated with each other.

In step S421, the camera CPU 210 compares the counter N with the captured image number M. If the counter N is equal to the captured image number M, the focus bracket shooting sequence is terminated. If the counter N is not equal to the captured image number M, the processing returns to step S415 to perform processing. Thus, shooting is repeatedly performed while changing the focus position until the counter N reaches the set captured image number M.

In step S422, the camera CPU 210 causes the display unit 212 to display the setting screen for AF micro adjustment as illustrated in FIG. 11B. Specifically, the CPU 210 reads any of the M images recorded in the storage unit 211 or the memory card by the focus bracket shooting, and displays the selected images on the display unit 212. For example, in the present exemplary embodiment, the fifth image corresponding to the reference defocus amount of DF=0 is first displayed among the M (nine) images.

Each display item will be described with reference to FIG. 11B. An image 505 is displayed as one of the images obtained by focus bracket shooting, and an image 506 indicates the shooting result of which one of the images. FIG. 11B illustrates an example in which the shooting result of the fifth image among the nine images captured by bracket shooting. Images 507 and 508 each indicate an image switching instruction. The user operates the left button or the right button of the operation member, thereby making it possible to display the image 505 by forward feed or reverse feed. In the example of FIG. 11B, when the left button is operated, the fourth image can be displayed, and when the right button is operated, the sixth image can be displayed. The CPU 210 reads designated images from the storage unit 211 or the memory card according to a user's instruction, and displays the read images on the display unit 212. The user selects the most in-focus image, or a desired image from among the nine captured images according to the instruction on the screen while operating the images.

After the user completes the selection of images, the camera CPU 210 determines in step S424 whether the SET button is operated. If the operation on the SET button is detected, the processing proceeds to the subsequent processing.

In step S425, the camera CPU 210 calculates the scale value based on the images selected in step S423. The images obtained by focus bracket shooting are stored in association with the defocus amount DF obtained during shooting. Accordingly, the scale value can be calculated based on the defocus amount DF corresponding to the image selected by the user, like in the third exemplary embodiment.

In step S426, the camera CPU 210 causes the display unit 212 to display the calculated scale value. The display of the display unit 212 at this time is the same as that illustrated in FIG. 9C according to the third exemplary embodiment.

In step S427, the camera CPU 210 determines whether the scale value calculated in step S425 falls within the range of settable scale values preliminarily set according to the open F-number of the imaging lens. If the calculated scale value falls within the range of settable values, the processing proceeds to step S429. If the calculated scale value is out of the range of settable values, the processing proceeds to step S428.

In step S428, the camera CPU 210 causes the display unit 212 to display a warning to notify the user that the scale value to be set is out of the range of recommended values. After the warning is displayed on the display unit 212, the processing returns to step S422 to cause the user to select images again. Like in the third exemplary embodiment, a scale value that is out of the range of recommended values may be set according to a user's instruction after a warning is displayed, or focus bracket shooting may be performed again.

In step S429, the camera CPU 210 stores the scale value in the storage unit 211 and then in step S430, the images captured by focus bracket shooting are deleted from the storage unit 211.

Thus, in the present exemplary embodiment, focus bracket shooting is performed and the user is caused to select in-focus images from a captured image group. The scale value is automatically set based on the selected images. Like in the first to third exemplary embodiments, the range of scale values that can be input is limited according to the open F-number of the imaging lens, thereby making it possible to reduce incorrect setting (incorrect image selection) by the user. Consequently, it is possible to provide a camera and an image pickup system which are capable of facilitating setting of an appropriate AF correction amount.

While the present exemplary embodiment illustrates a case where the focus detection unit 207 is used as a method for focus adjustment (S408) before focus bracket shooting is started, the focus adjustment method is not limited to this method. For example, the focus adjustment may be performed by verifying the live view image while manually operating the focus lens 101 of the imaging lens. In this case, the focus adjustment may be manually performed during steps S404 to S409 in the flowchart of FIG. 10A. As another method, the live AF operation may be used. The camera is shifted to the live view state before step S404, and the live view image is displayed simultaneously with the AF micro adjustment setting screen in step S404, thereby enabling the live AF operation.

In the present exemplary embodiment, the focus bracket range of 2F5 is used regardless of the value of the open F-number. However, the bracket shooting range may be changed according to the information about the lens, such as the open F-number or focal depth. For example, the focus bracket range when the open F-number is equal to or more than a predetermined value may be set to be narrower than the focus bracket range when the open F-number is less than the predetermined value, so that a large correction amount and the scale value corresponding to the large correction amount are prevented from being set. To narrow the focus bracket range, the time may be shortened by reducing the number of captured images, or more detailed setting may be performed by reducing the focus bracketing step amount ST.

Modified Examples

The first to fourth exemplary embodiments mainly illustrate an example where the storage unit stores scale values. However, correction amounts respectively corresponding to scale values may be stored instead of storing the scale values. If the correction amounts are stored, the correction amounts can be read from the storage unit during shooting processing. Accordingly, the processing of acquiring the corresponding correction amount from the scale value during acquisition of the drive amount of the focus lens can be omitted. The method for calculating the correction amount from the scale value is described in the first exemplary embodiment. Instead of calculating the correction amount, a table indicating the relationship between scale values and correction amounts for each focal depth may be referenced. The first to fourth exemplary embodiments illustrate an example in which the range of settable scale values or the range of recommended setting values is set based on the open F-number. However, the range of settable scale values or the range of recommended setting values may be set based on the focal depth. Since the focal depth is a value based on the open F-number, the mode of setting the range of settable scale values or the range of recommended values is herein referred to as setting of the range of settable scale values or the range of recommended setting values based on the open F-number. When the correction amount per scale value is set based on the focal depth, also the range of settable values or the range of recommended setting values is desirably set based on the focal depth. However, since a variation in the value of the open F-number is larger than a variation in the value of the permissible confusion circle diameter of each lens unit and the effect on a variation of the focal depth is large, the range of settable scale values or the range of recommended setting values may be set based only on the open F-number.

While the first to fourth exemplary embodiments illustrate the scale marks (203, 303, 403) each indicating the range of settable scale values or the range of recommended values and the scale marks (204, 304, 404) each indicating the set scale value are displayed on the setting screen, the present disclosure is not limited to this mode. For example, as the setting screen, only the AF micro adjustment mode and the current setting value (e.g., "+2") may be displayed. In other words, the present disclosure can be applied to a wide variety of modes for selecting an adjustment value from among a plurality of adjustment value candidates according to a user's operation like in the first and second exemplary embodiments, or manually like in the third and fourth exemplary embodiment.

The first to fourth exemplary embodiments illustrate an example in which a lens is attached to an image pickup apparatus and an adjustment value is set when lens information can be acquired from the lens. However, the adjustment value can be set when the lens is not attached to the image pickup apparatus according to the first and second exemplary embodiments, or when the lens is attached to the image pickup apparatus but the lens information cannot be acquired. In this case, it is to set the first range as an upper limit in the design of the image pickup apparatus without limiting the range of settable adjustment values.

The image pickup apparatus may have both the mode in which the scale value is directly input from the user like in the first and second exemplary embodiments and the mode in which the scale value is automatically acquired based on a user's operation like in the third and fourth exemplary embodiments. The image pickup apparatus having both modes enables the user to perform a fine adjustment of the scale value based on the scale value set using the third or fourth exemplary embodiment.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-102856, filed May 24, 2017, and No. 2018-081156, filed Apr. 20, 2018, which are hereby incorporated by reference herein in their entirety.

What is claimed is:

1. An image pickup apparatus to which a lens unit is attachable, the image pickup apparatus comprising:
at least one processor and a memory holding a program which makes the processor function as:
an acquisition unit configured to acquire information about the attached lens unit;
a setting unit capable of setting an adjustment value for setting, from a plurality of values, an adjustment amount for adjusting a focal point shift amount of the lens unit; and a control unit configured to acquire the adjustment amount based on the adjustment value set by the setting unit and the information about the lens unit acquired by the acquisition unit, and adjust the focal point shift amount of the lens unit by using the adjustment amount, wherein the setting unit changes a first range according to the information about the lens unit acquired by the acquisition unit such that the first range when an open F-number is a first value is wider than the first range when the open F-number is a second value greater than the first value, the first range being a range of settable adjustment values.

2. The image pickup apparatus according to claim 1, wherein the processor further function as a detection unit configured to detect a user's operation, wherein the setting unit is capable of setting the adjustment value from a plurality of values in the first range according to the user's operation detected by the detection unit, and wherein the setting unit changes a range of the adjustment value settable by a user by changing the first range.

3. The image pickup apparatus according to claim 2, wherein the setting unit is capable of setting the adjustment value in a first mode for setting the adjustment value according to the user's operation and in a second mode for setting the adjustment value based on the focal point shift amount of the lens unit.

4. The image pickup apparatus according to claim 1, further comprising an image sensor configured to photoelectrically convert light from the attached lens unit, wherein the control unit controls the image sensor and an in-focus position of the lens unit to acquire a plurality of images with different in-focus positions, and the setting unit is capable of setting the adjustment value based on an image selected from the plurality of images.

5. The image pickup apparatus according to claim 1, wherein the setting unit sets the adjustment value based on the focal point shift amount of the lens unit.

6. The image pickup apparatus according to claim 1, wherein the plurality of values is set at a predetermined interval, and the predetermined interval is changed according to information included in the information about the lens unit.

7. The image pickup apparatus according to claim 1, wherein the information about the lens unit includes an open F-number of the lens unit.

8. The image pickup apparatus according to claim 7, further comprising a storage unit configured to store information indicating a relationship between the first range and the open F-number of the attached lens unit, wherein the first range is acquired from the information indicating the relationship between the first range and the open F-number of the attached lens unit and the open F-number acquired by the acquisition unit.

9. The image pickup apparatus according to claim 7, wherein the setting unit calculate an upper limit and a lower limit of the first range by using a function including the open F-number as a variable.

10. The image pickup apparatus according to claim 7, wherein the acquisition unit receives information indicating the open F-number from the lens unit.

11. The image pickup apparatus according to claim 7, wherein the acquisition unit receives lens identification information from the lens unit, and information indicating the open F-number is acquired based on the lens identification information.

12. The image pickup apparatus according to claim 1, wherein the control unit sends an instruction about a drive amount of a focus lens to the lens unit, the focus lens being included in the lens unit.

13. An image pickup apparatus to which a lens unit is attachable, the image pickup apparatus comprising:

at least one processor and a memory holding a program which makes the processor function as:

an acquisition unit configured to acquire information about the attached lens unit;

a control unit configured to display a setting screen on a display device, the setting screen including information indicating a range of settable adjustment values for setting an adjustment amount for adjusting a focal point shift amount of the lens unit;

a detection unit configured to detect a user's operation;

a setting unit capable of setting the adjustment value from a plurality of values in the range of settable adjustment values according to the user's operation detected by the detection unit; and a control unit configured to adjust the focal point shift amount of the lens unit by using the adjustment amount acquired based on the adjustment value set by the setting unit and the information about the lens unit acquired by the acquisition unit, wherein the display device displays, in a distinguishable manner, a first range in the range of settable adjustment values and a second range including a range larger than an upper limit of the first range and a range smaller than a lower limit of the first range, and the setting unit changes the first range according to the information about the lens unit acquired by the acquisition unit such that the first range when an open F-number is a first value is wider than the first range when the open F-number is a second value greater than the first value.

14. The image pickup apparatus according to claim 13, wherein upon receiving an instruction to set an adjustment value within the second range, the display device displays a warning.

15. The image pickup apparatus according to claim 13, wherein the display device displays the first range and the second range in a distinguishable manner by setting different colors for the first range and the second range, respectively.

16. The image pickup apparatus according to claim 13, wherein an absolute value of the upper limit of the first range is equal to an absolute value of the lower limit of the first range.

17. The image pickup apparatus according to claim 13, wherein the information about the lens unit includes an open F-number of the lens unit, and when the open F-number is equal to or smaller than a predetermined value, the second range is not set.

18. A control method for an image pickup apparatus, comprising:

acquiring information about an attached lens unit;

setting an adjustment value for setting, from a plurality of values, an adjustment amount for adjusting a focal point shift amount of the lens unit; and acquiring the adjustment amount based on the set adjustment value and the acquired information about the lens unit, and adjusting the focal point shift amount of the lens unit by using the adjustment amount, wherein in the setting of the adjustment value, a first range is changed according to the information about the lens unit such that the first range when an open F-number is a first value is wider than the first range when the open F-number is a second value greater than the first value, the first range being a range of settable adjustment values.

19. A control method for an image pickup apparatus, comprising:
   acquiring information about an attached lens unit;
   displaying, on a display device, a setting screen including information indicating a range of settable adjustment values for setting an adjustment amount for adjusting a focal point shift amount of the lens unit;
   receiving a user's operation;
   setting the adjustment value from a plurality of values in the range of settable values according to the received user's operation; and
   adjusting the focal point shift amount of the lens unit by using the adjustment amount acquired based on the set adjustment value and the information about the lens unit,
   wherein on the setting screen, a first range in the range of settable values and a second range including a range larger than an upper limit of the first range and a range smaller than a lower limit of the first range are displayed in a distinguishable manner, and the first range is changed according to the acquired information about the lens unit such that the first range when an open F-number is a first value is wider than the first range when the open F-number is a second value greater than the first value.

* * * * *